United States Patent
Fukumoto et al.

(10) Patent No.: US 9,744,595 B2
(45) Date of Patent: Aug. 29, 2017

(54) COATED COPPER PARTICLES AND METHOD FOR PRODUCING THE SAME

(71) Applicant: KYORITSU CHEMICAL & CO., LTD., Tokyo (JP)

(72) Inventors: Kunihiro Fukumoto, Chiba (JP); Yu Oyama, Chiba (JP)

(73) Assignee: KYORITSU CHEMICAL & CO., LTD., Tokyo (JP)

( * ) Notice: Subject to any disclaimer, the term of this patent is extended or adjusted under 35 U.S.C. 154(b) by 0 days.

(21) Appl. No.: 15/307,227

(22) PCT Filed: May 14, 2015

(86) PCT No.: PCT/JP2015/063880
§ 371 (c)(1),
(2) Date: Oct. 27, 2016

(87) PCT Pub. No.: WO2015/182395
PCT Pub. Date: Dec. 3, 2015

(65) Prior Publication Data
US 2017/0043404 A1    Feb. 16, 2017

(30) Foreign Application Priority Data

May 30, 2014    (JP) ................. 2014-112794

(51) Int. Cl.
| | |
|---|---|
| *B22F 9/24* | (2006.01) |
| *B22F 9/30* | (2006.01) |
| *B22F 1/02* | (2006.01) |
| *H01B 1/22* | (2006.01) |
| *B22F 1/00* | (2006.01) |

(52) U.S. Cl.
CPC ............ *B22F 9/305* (2013.01); *B22F 1/0062* (2013.01); *B22F 1/02* (2013.01); *B22F 9/24* (2013.01); *H01B 1/22* (2013.01); *B22F 1/0018* (2013.01); *B22F 9/30* (2013.01); *Y02E 60/324* (2013.01)

(58) Field of Classification Search
None
See application file for complete search history.

(56) References Cited

U.S. PATENT DOCUMENTS

| | | | | |
|---|---|---|---|---|
| 6,951,666 B2* | 10/2005 | Kodas | ............. | C09D 11/30 |
| | | | | 257/E21.174 |
| 7,651,782 B2* | 1/2010 | Shirata | ............. | B22F 1/0022 |
| | | | | 428/548 |
| 2005/0285084 A1 | 12/2005 | Fujii et al. | | |
| 2008/0178761 A1* | 7/2008 | Tomotake | ............. | C23C 18/06 |
| | | | | 106/1.26 |
| 2013/0236637 A1 | 9/2013 | Kashiwabara et al. | | |
| 2015/0056426 A1* | 2/2015 | Grouchko | ............. | C09D 11/52 |
| | | | | 428/208 |
| 2017/0073538 A1* | 3/2017 | Kawasaki | ............. | B22F 9/24 |

FOREIGN PATENT DOCUMENTS

| | | |
|---|---|---|
| JP | H08-143916 A | 6/1996 |
| JP | 2003-239006 A | 8/2003 |
| JP | 2004-273446 A | 9/2004 |
| JP | 3900414 B2 | 4/2007 |
| JP | 2008-013466 A | 1/2008 |
| JP | 2008-031104 A | 2/2008 |
| JP | 2009-082828 A | 4/2009 |
| JP | 2011-032509 A | 2/2011 |
| JP | 2011-032558 A | 2/2011 |
| JP | 2012-041592 A | 3/2012 |
| JP | 2013-047365 A | 3/2013 |
| JP | 2014-201618 A | 10/2014 |
| KR | 20060048501 A | 5/2006 |
| WO | 2012/053456 A1 | 4/2012 |

OTHER PUBLICATIONS

Translation of JP 2009-158441-A (published Jul. 16, 2008), from J-Plat Pat.*
Translation of JP 2011-032558-A (published Feb. 17, 2011), from J-Plat Pat.*
International Search Report issued in PCT/JP2015/063880, mailed Aug. 18, 2015 (2 pages).
Written Opinion of the International Searching Authority issued in PCT/JP2015/063880, mailed Aug. 18, 2015 (4 pages).
Japanese Office Action in corresponding Application No. 2014-112794 mailed on Mar. 8, 2016 (5 pages).
Office Action issued in corresponding Korean Application No. 10-2016-7034561 dated Jan. 10, 2017 (7 pages).

* cited by examiner

*Primary Examiner* — George Wyszomierski
(74) *Attorney, Agent, or Firm* — Osha Liang LLP

(57) ABSTRACT

A method for producing coated copper particles having a surface coated with an aliphatic carboxylic acid, wherein the method comprises obtaining a reaction mixture containing copper formate, an amino alcohol, an aliphatic carboxylic acid having an aliphatic group having 5 or more carbon atoms, and a solvent, and subjecting a complex compound formed in the reaction mixture to thermal decomposition treatment to form metal copper, wherein a ΔSP value, which is a difference in SP value between the amino alcohol and the solvent, is 4.2 or more.

20 Claims, 29 Drawing Sheets

COATED COPPER PARTICLES AND METHOD FOR PRODUCING THE SAME

FIELD OF THE INVENTION

The present invention relates to a coated copper particle and a method for producing the same.

BACKGROUND ART

In recent years, in the fields of electronic devices, the technical field called printable electronics has attracted attention, in which a very fine wiring of a micrometer size is directly formed by an inkjet printing method or other printing methods without a need of patterning of a wiring or a protective film by light exposure. Fine particles of gold or silver were mainly used at the beginning of the development of this technique, but gold has a problem of the cost, and silver has problems about the electromigration and the corrosion resistance for, for example, corrosion due to a sulfide gas. As a means for solving these problems, copper materials have attracted attention. Copper materials exhibit high conductivity equivalent to gold or silver and are considerably excellent in respect of the electromigration, as compared to silver, and further have excellent corrosion resistance.

Gold and silver, which are a noble metal, have properties such that they are relatively unlikely to be oxidized. For this reason, when a dispersion of metal fine particles of gold or silver is prepared, it is easy to maintain the dispersion while preventing an oxide film from forming on the surface of the metal fine particles contained in the dispersion. In contrast, copper has properties such that it is relatively likely to be oxidized, and this tendency is further remarkable particularly for the copper fine particles having a particle diameter as small as 200 nm or less due to the size effect and specific surface area. When a dispersion of copper fine particles is prepared, the copper fine particles contained in the dispersion become in a state in a short period of time such that the surface of the copper particles is covered with an oxide film, and further the oxide film on the surface of the copper particles increases in thickness with the passage of time, so that the portion occupying almost all the particle diameter of the copper fine particles is often converted to the copper oxide film. Further, 200 nm or less copper fine particles are in a state such that the surface of the particles is extremely highly active, and, even when subjected to a method in which heating or calcination is performed in an inert atmosphere of, for example, nitrogen gas or under vacuum conditions, oxidation may proceed due to a very small amount of oxygen present in the atmosphere to inhibit sintering of the copper fine particles with one another. Further, when reducing calcination is performed using, for example, hydrogen gas at the final stage of calcination, the increase of the oxide film during the calcination may cause marked volume shrinkage upon reducing the film, leading to a lowering of the calcination density.

Meanwhile, one of the reasons why the technique using metal fine particles has attracted attention resides in melting point depression due to a size effect. Taking gold as an example, the melting point depression due to a size effect has been reported as follows. Gold in the form of a simple substance has a melting point of 1,064° C. When gold is in the form of particles having a particle diameter of about 2 nm, the melting point is reduced to about 300° C. which is a temperature at which electronic materials and others can be used. However, when gold is in the form of particles having a particle diameter of more than 20 nm, almost no melting point depression is recognized. From the above, single-nanometer-sized metal fine particles having a particle diameter of about 2 nm can be satisfactorily expected to suffer melting point depression. With respect to the copper fine particles, however, a surface protecting agent for preventing oxidation is indispensable. Considering the specific surface area of the copper fine particles, the amount of the surface protecting agent required for the copper fine particles is several times or more the volume of copper, and the surface protecting agent in such a large amount causes marked volume shrinkage during the sintering, making it difficult to obtain a sintered material having a high density. For removing this disadvantage, a method has been known in which single-nanometer-sized particles are formed from a metal oxide in a reducing atmosphere at the sintering stage, and sintered at a temperature of about 300 to 400° C. utilizing the melting point depression due to a size effect. In addition, a method has been proposed in which, like a flux effect of a solder, an oxide film covering the surface of fine particles is removed by a fluxing agent, such as an organic carboxylic acid, so that the reduced metal surface is exposed, followed by sintering (see, for example, Japanese Unexamined Patent Publication No. 2013-047365).

When the copper fine particles are applied to printable electronics, a paste is prepared from the copper fine particles and then supplied. Therefore, copper fine particles exhibiting a monodisperse particle diameter distribution are prepared so as to obtain a copper paste material having excellent dispersion stability. With respect to the method for producing metal fine particles or metal oxide fine particles having a uniform particle diameter, several proposals have been made. For example, with respect to a liquid phase synthesis of metal fine particles, reference is often made to the LaMer model representing the relationship between the solubility of the solute which constitutes a metal nucleus and the time. According to this, when the rate of formation of metal nuclei having a low solubility is too fast, growth of particles occurs in accordance with an aggregation mechanism, so that the growth of crystal nuclei is disadvantageously unsatisfactory to cause particles in an aggregate form. For solving this problem, a method of controlling the rate of formation of metal nuclei which are a solute has been made. For example, by permitting a material needed for the growth of particles to be gradually emitted from a reservoir (solid or metal chelate), the degree of supersaturation of the solution is controlled to suppress new nucleation during the growth of particles, so that the nucleation period and the particle growth period are separated so as to allow only the nuclei formed early in the initial stage to grow, making it possible to form monodisperse particles. As a method of selecting a reservoir for supplying the solute during the growth of particles, a solid or complex compound having a satisfactorily low solubility or dissolution rate is selected.

In connection with the above, a technique in which a complex compound derived from copper formate is subjected to thermal decomposition to produce copper fine particles has been known. Copper formate has a decomposition temperature of about 220° C., but copper formate having a complex structure can be reduced in the decomposition temperature. For example, Japanese Unexamined Patent Publication No. 2011-032558 has proposed a method in which, using a complex compound of an amino alcohol which functions as a bidentate ligand, the complex compound is subjected to thermal decomposition at 100° C. to produce metal fine particles. Japanese Unexamined Patent Publication Nos. 2008-013466 and 2008-031104 have proposed a method in which, using a complex compound of an aliphatic amine which functions as a monodentate ligand, the complex compound is subjected to thermal decomposition at 120° C. to produce metal fine particles.

Further, a method has been made in which the metal nuclei incorporated into the growing nuclei in a microreaction field using a surfactant are restricted to control the particle diameter. For example, there has been proposed a method for producing metal or metal oxide fine particles by a reversed micelle method in which nanometer-sized water droplets stably dispersed in an organic solvent using a surfactant are used as a reaction field (see, for example, Japanese Unexamined Patent Publication Nos. Hei 08-143916 and 2009-082828 and Japanese Patent No. 3900414).

PRIOR ART REFERENCES

Patent Documents

Patent document 1: Japanese Unexamined Patent Publication No. 2011-032558
Patent document 2: Japanese Unexamined Patent Publication No. 2008-013466
Patent document 3: Japanese Unexamined Patent Publication No. 2008-031104
Patent document 4: Japanese Unexamined Patent Publication No. 2013-047365
Patent document 5: Japanese Unexamined Patent Publication No. Hei 08-143916
Patent document 6: Japanese Unexamined Patent Publication No. 2009-082828
Patent document 7: Japanese Patent No. 3900414

SUMMARY OF THE INVENTION

Problems to be Solved by the Invention

However, in the technique described in Japanese Unexamined Patent Publication No. 2011-032558, the decomposition temperature of the complex compound is too low, and therefore heat generated due to decomposition of the complex compound forms a great amount of metal nuclei at an increasing speed, and further the concentration of copper contained in the reaction mixture is as relatively high as 1.0 to 2.4 mol/L, and hence growth of particles is likely to occur in accordance with an aggregation mechanism to form coarse particles, causing the yield to be lowered.

Further, in the technique described in Japanese Unexamined Patent Publication Nos. 2008-013466 and 2008-031104, the aliphatic amine constituting the copper formate complex functions also as a dispersion protecting agent for metal fine particles, and therefore growth of particles is unlikely to occur, making it difficult to produce copper particles having a particle diameter of 20 nm to submicron.

Furthermore, in the technique described in Japanese Unexamined Patent Publication No. 2013-047365, a copper compound in a solid state, such as copper oxide having a low solubility, is used as a reservoir, and a reduction is conducted while partially dissolving the copper compound with an organic carboxylic acid, and therefore the rate of formation of nuclei is restricted, and aggregation is unlikely to occur at the stage of growth of nuclei, as compared to the dissolution system as described in Japanese Unexamined Patent Publication No. 2011-032558. Aggregation can be controlled; however, the time during which nuclei are being formed is long, and the carbon chain of the carboxylic acid coating the particles is so short that a satisfactory repulsive force between the particles cannot be obtained, and therefore it is difficult to produce particles having a uniform particle size distribution, and further it is likely that copper particles having a surface oxidized are formed.

In the reversed micelle method described in Japanese Unexamined Patent Publication Nos. Hei 08-143916 and 2009-082828 and Japanese Patent No. 3900414, micelles are stabilized using a large amount of a surfactant, and therefore the size of the micelles is kept constant during the reaction, but the size of the reaction field is restricted, making it difficult to produce 20 nm or more particles. Further, in the reversed micelle method, it is difficult to keep high the concentration of the copper compound in the reaction mixture, and hence the reversed micelle method is unsuitable for producing a large amount of particles.

In view of the above, an object of the present invention is to solve the problems accompanying the prior art and to provide a coated copper particle having both excellent oxidation resistance and excellent sintering property, which have been difficult to achieve in the prior art. Further, an object of the present invention is to provide a method for producing coated copper particles in which coated copper particles having both excellent oxidation resistance and excellent sintering property can be obtained in a low thermal treatment temperature and a low oxygen-concentration environment.

Means for Solving the Problems

The present inventors have conducted studies with a view toward solving the above-mentioned problems. As a result, it has been found that, by appropriately selecting the difference in SP value between the solvent and the amino alcohol, which is a complexing agent, contained in the reaction mixture, the reaction system can be constructed so that the system is homogeneous at the initial stage of the reaction and forms a two-phase separation structure at the middle stage of the reaction, making it possible to efficiently produce high-quality coated copper particles.

The present invention includes the following embodiments.

(1) A method for producing coated copper particles having a surface coated with an aliphatic carboxylic acid, wherein the method comprises obtaining a reaction mixture containing copper formate, an amino alcohol, an aliphatic carboxylic acid having an aliphatic group having 5 or more carbon atoms, and a solvent, and subjecting a complex compound formed in the reaction mixture to thermal decomposition treatment to form metal copper, wherein a $\Delta SP$ value, which is a difference in SP value between the amino alcohol and the solvent, is 4.2 or more.

(2) The method for producing coated copper particles according to item (1) above, wherein the amino alcohol has an SP value of 11.0 or more.

(3) The method for producing coated copper particles according to item (1) or (2) above, wherein the temperature for the thermal decomposition treatment is 100 to 130° C.

(4) The method for producing coated copper particles according to any one of items (1) to (3) above, wherein the solvent comprises an organic solvent capable of forming an azeotrope together with water, wherein the method comprises removing at least part of water formed due to the thermal decomposition treatment in the manner of an azeotropy.

(5) The method for producing coated copper particles according to any one of items (1) to (4) above, wherein the aliphatic group portion of the aliphatic carboxylic acid has 5 to 17 carbon atoms.

(6) The method for producing coated copper particles according to any one of items (1) to (5) above, wherein the reaction mixture has a copper ion concentration of 1.0 to 2.5 mol/liter.

(7) A coated copper particle which is obtained by the method for producing coated copper particles according to any one of items (1) to (6) above, wherein the coated copper particle has an average primary particle diameter $D_{SEM}$ of 0.02 to 0.2 μm, as determined by a SEM examination, wherein a value of a coefficient of variation of the particle size distribution (standard deviation SD/average primary particle diameter $D_{SEM}$) is 0.1 to 0.5.

(8) A coated copper particle which is obtained by the method for producing coated copper particles according to any one of items (1) to (6) above, wherein the coated copper particle has a $D_{XRD}/D_{SEM}$ ratio of 0.25 to 1.00 wherein the $D_{XRD}/D_{SEM}$ ratio is a ratio of a crystal particle diameter $D_{XRD}$, as determined by a powder X-ray analysis, to an average primary particle diameter $D_{SEM}$, as determined by a SEM examination.

(9) A conductive composition for screen printing, comprising coated copper particles obtained by the method for producing coated copper particles according to any one of items (1) to (6) above and a medium.

(10) A conductive composition for inkjet printing, comprising coated copper particles obtained by the method for producing coated copper particles according to any one of items (1) to (6) above and a medium.

(11) A circuit formed article comprising a substrate, and a wiring pattern which is disposed on the substrate, and which is a thermal treatment product of the conductive composition according to item (9) or (10) above.

Effects of the Invention

In the present invention, there can be provided a coated copper particle having both excellent oxidation resistance and excellent sintering property, which have been difficult to achieve in the prior art. Further, in the present invention, there can be provided a method for producing coated copper particles in which coated copper particles having both excellent oxidation resistance and excellent sintering property can be obtained in a low thermal treatment temperature and a low oxygen-concentration environment.

MODE FOR CARRYING OUT THE INVENTION

Figure 1A:
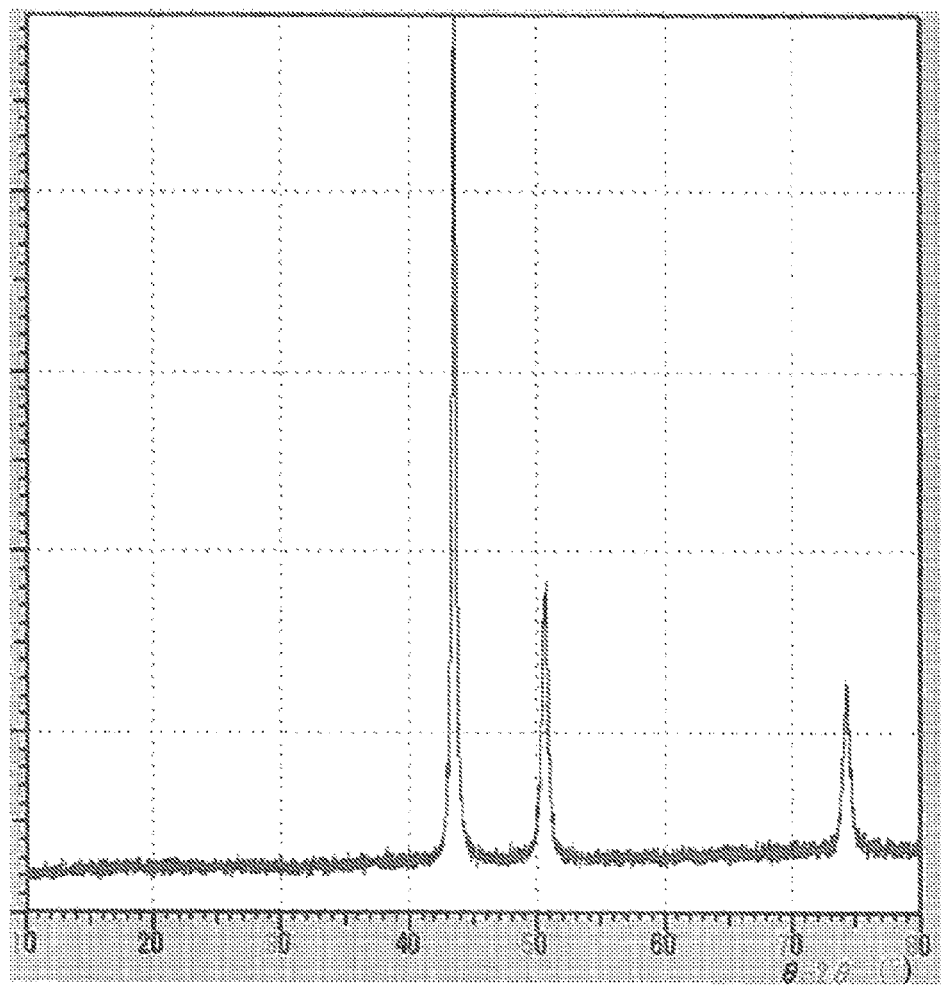
FIG. 1A XRD data of the coated copper particles prepared in Example 1, which is measured immediately after being synthesized.

In the present specification, the term "step" means not only an independent step but also a combination of steps which cannot be distinguished from one another as long as a desired purpose of the steps is achieved. Further, the range of values indicated using the preposition "to" means a range of values including the respective values shown before and after the preposition "to" as the minimum value and the maximum value. Furthermore, with respect to the amount of the component of a composition, when a plurality of materials corresponding to the components are present in the composition, the amount of the components in the composition means the total amount of the materials present in the composition unless otherwise specified.

<Method for Producing Coated Copper Particles>

The method for producing coated copper particles according to the present embodiment is a method for producing coated copper particles having a surface coated with an aliphatic carboxylic acid, wherein the method comprises obtaining a reaction mixture containing copper formate, an amino alcohol, an aliphatic carboxylic acid having an aliphatic group having 5 or more carbon atoms, and a solvent, and subjecting a complex compound formed in the reaction mixture to thermal decomposition treatment to form metal copper, wherein a ΔSP value, which is a difference in SP value between the amino alcohol and the solvent, is 4.2 or more.

Copper formate is used as a starting material, and a thermal decomposition reduction reaction of a copper formate complex is allowed to proceed in a liquid phase, and, as the reaction proceeds, an amino alcohol incompatible with the reaction solvent is emitted from the copper formate complex into the reaction solvent to form a new reaction field which is like a water-in-oil emulsion. It is considered that, while continuously generating copper metal nuclei in the reaction field, a nucleus growth reaction proceeds, forming reduced copper particles having excellent oxidation resistance and excellent sintering property and having a particle diameter controlled so that the particle size is uniform. Further, by appropriately controlling the rate of thermal decomposition of the copper formate complex, the supply of the solute is controlled. This is considered to control the growth of metal nuclei to form reduced copper particles having a more uniform particle size.

When an aliphatic carboxylic acid is further present in the liquid phase, the formed reduced copper particles are coated with the aliphatic carboxylic acid through physical adsorption at a high density. The thus produced coated copper particles are comprised of reduced copper particles having almost no oxide film, and have the surface thereof coated with the aliphatic carboxylic acid through physical adsorption, and therefore are considered to have excellent balance between the oxidation resistance and the sintering property. By virtue of this, the aliphatic carboxylic acid coating the copper particles as an organic protecting agent is removed at a temperature of 400° C. or lower in the calcination step for the coated copper particles. Thus, sintering of the coated copper particles can be achieved in a low oxygen-concentration atmosphere which can be created using a means of, for example, purging with nitrogen without using a reducing atmosphere of, for example, hydrogen gas. Therefore, the coated copper particles can be effectively used in a site to which conventional copper particles that require a reducing atmosphere for sintering cannot be applied, for example, a site which poses a problem of change in properties due to hydrogen embrittlement or a reaction with hydrogen. Further, the coated copper particles can be sintered utilizing an existing facility, such as a nitrogen-purged reflow furnace, and therefore are excellent from an economical point of view.

The reaction mixture used in the method for producing coated copper particles according to the present embodiment contains copper formate, at least one amino alcohol, at least one aliphatic carboxylic acid having an aliphatic group having 5 or more carbon atoms, and a solvent. The reaction mixture may further contain another additive if necessary.

(Copper Formate)

Copper formate is comprised of a bivalent copper ion and 2 mol of a formic acid ion relative to 1 mol of the copper ion. The copper formate may be either an anhydride or a hydrate. Further, commercially available copper formate may be used, or copper formate newly prepared may be used.

A method in which copper formate is subjected to thermal decomposition to obtain reduced copper fine particles is disclosed in, for example, Japanese Examined Patent Publication No. Sho 61-19682. Formic acid has reducing properties unlike a general carboxylic acid. Therefore, when copper formate is subjected to thermal decomposition, it is possible to reduce a bivalent copper ion. For example, it is known that when copper formate anhydride is heated in an inert gas, it suffers thermal decomposition at 210 to 250° C. to form metal copper.

With respect to the amount of the copper formate contained in the reaction mixture, there is no particular limitation, and the amount of the copper formate can be appropriately selected according to, for example, the purpose. For example, from the viewpoint of the production efficiency, the amount of the copper formate contained in the reaction mixture is preferably 1.0 to 2.5 mol/liter, more preferably 1.5 to 2.5 mol/liter, especially preferably 2.0 to 2.5 mol/liter.

(Amino Alcohol)

With respect to the amino alcohol, there is no particular limitation as long as it is an alcohol compound having at least one amino group and being capable of forming a complex compound together with copper formate. By virtue of the amino alcohol present in the reaction mixture, a complex compound is formed from copper formate, making it possible to solubilize copper formate in the solvent.

The amino alcohol is preferably a monoaminomonoalcohol compound, more preferably a monoaminomonoalcohol compound having an unsubstituted amino group. Further, the amino alcohol is also preferably a monodentate-coordinating monoaminomonoalcohol compound.

With respect to the boiling point of the amino alcohol, there is no particular limitation. However, it is preferred that the boiling point of the amino alcohol is higher than the reaction temperature for the thermal decomposition treatment. Specifically, the boiling point of the amino alcohol is preferably 120° C. or higher, more preferably 130° C. or higher. The upper limit of the boiling point is not particularly limited, and is, for example, 400° C. or lower, preferably 300° C. or lower.

Further, in view of the polarity, the amino alcohol preferably has an SP value of 11.0 or more, more preferably 12.0 or more, further preferably 13.0 or more. The upper limit of the SP value of the amino alcohol is not particularly limited, and is, for example, 18.0 or less, preferably 17.0 or less.

In the present specification, the SP value is according to the Hildebrand's definition. According to this definition, an SP value means a square root of intermolecular bonding energy $E_1$ per 1 mL of a sample at 25° C. As a calculation method for SP value, the method described in "The Japan Petroleum Institute Homepage" (http://sekiyu-gakkai.or.jp/jp/dictionary/petdicsolvent.html#solubility2) is employed. Specifically, an SP value is calculated as follows.

Intermolecular bonding energy $E_1$ is a value obtained by subtracting a gas energy from an evaporation latent heat. Evaporation latent heat Hb is given by the following equation using boiling point Tb of a sample.

$$Hb=21\times(273+Tb)$$

From the Hb value, molar evaporation latent heat $H_{25}$ at 25° C. is determined by the following equation.

$$H_{25}=Hb\times[1+0.175\times(Tb-25)/100]$$

From molar evaporation latent heat $H_{25}$, intermolecular bonding energy E is determined by the following equation.

$$E=H_{25}-596$$

From intermolecular bonding energy E, intermolecular bonding energy $E_1$ per 1 mL of a sample is determined by the following equation.

$$E_1=E\times D/Mw$$

In the above equation, D is a density of the sample, and Mw is a molecular weight of the sample. From $Y_1$, an SP value is determined by the following equation.

$$SP=(E_1)^{1/2}$$

With respect to the solvent containing an OH group, correction of +1 for one OH group is needed.
[see, for example, Mitsubishi Oil Technical Data, No. 42, p3, p11 (1989)]

Specific examples of amino alcohols include 2-aminoethanol (boiling point: 170° C.; SP value: 14.54), 3-amino-1-propanol (boiling point: 187° C.; SP value: 13.45), 5-amino-1-pentanol (boiling point: 245° C.; SP value: 12.78), DL-1-amino-2-propanol (boiling point: 160° C.; SP value: 12.74), and N-methyldiethanolamine (boiling point: 247° C.; SP value: 13.26), and preferred is at least one member selected from the group consisting of these amino alcohols.

The amino alcohols may be used individually or in combination.

With respect to the amount of the amino alcohol contained in the reaction mixture, there is no particular limitation, and the amount of the amino alcohol can be appropriately selected according to, for example, the purpose. The amount of the amino alcohol contained is, for example, preferably in the range of from 1.5 to 4.0 times, more preferably in the range of from 1.5 to 3.0 times the amount of copper ions contained in the reaction mixture, in terms of mol. When the amount of the amino alcohol contained is 1.5 times or more the amount of copper ions, in terms of mol, satisfactory solubility of copper formate can be obtained, so that the period of time required for the reaction can be reduced. On the other hand, when the amount of the amino alcohol contained is 4.0 times or less the amount of copper ions, in terms of mol, contamination of the formed coated copper particles can be suppressed.

(Aliphatic Carboxylic Acid)

With respect to the aliphatic carboxylic acid, there is no particular limitation as long as it is a long-chain aliphatic carboxylic acid having an aliphatic group having 5 or more carbon atoms. The aliphatic group may be either linear or branched, and may be either a saturated aliphatic group or an unsaturated aliphatic group. The aliphatic group has 5 or more carbon atoms, preferably 5 to 17 carbon atoms, more preferably 7 to 17 carbon atoms. When the aliphatic group has 5 or more carbon atoms, the variation as an index of the particle size distribution of the resultant coated copper particles tends to become smaller. The reason for this is presumed that, for example, there is a high correlation between the length of the carbon chain and the van der Waals force which largely influences force of association. Specifically, it is considered that a carboxylic acid having a long carbon chain has so strong force of association that it contributes to stabilization of a water-in-oil emulsion-like phase, which is a micro-reaction field, making it possible to efficiently produce copper particles having a uniform particle diameter.

It is preferred that the boiling point of the aliphatic carboxylic acid is higher than the temperature for the thermal decomposition treatment. Specifically, the boiling point of the aliphatic carboxylic acid is preferably 120° C. or higher, more preferably 130° C. or higher. The upper limit of the boiling point is not particularly limited, and is, for example, 400° C. or lower. When the boiling point of the aliphatic carboxylic acid is 400° C. or lower, the resultant coated copper particles tend to be further improved in the sintering property.

Specific examples of aliphatic carboxylic acids include oleic acid, linoleic acid, stearic acid, heptadecanoic acid, lauric acid, and octanoic acid, and preferred is at least one member selected from the group consisting of these aliphatic carboxylic acids.

The aliphatic carboxylic acids may be used individually or in combination.

With respect to the amount of the aliphatic carboxylic acid contained in the reaction mixture, there is no particular limitation, and the amount of the aliphatic carboxylic acid can be appropriately selected according to, for example, the purpose. The amount of the aliphatic carboxylic acid contained is, for example, based on the mol of copper ions contained in the reaction mixture, preferably in the range of from 2.5 to 25 mol %, more preferably in the range of from 5.0 to 15 mol %. When the amount of the aliphatic carboxylic acid contained is 25 mol % or less, based on the mol of copper ions, it is likely that an increase of the viscosity of the reaction system can be suppressed. On the other hand, when the amount of the aliphatic carboxylic acid contained is 2.5 mol % or more, based on the mol of copper ions, it is likely that a satisfactory reaction rate can be obtained to improve the productivity, and the variation as an index of the particle size distribution tends to become smaller.

(Solvent)

With respect to the solvent constituting the reaction mixture, there is no particular limitation as long as the solvent is selected so that it does not excessively inhibit the reduction reaction caused by formic acid and a ΔSP value, which is a difference in SP value between the amino alcohol and the solvent, becomes 4.2 or more, and the solvent can be appropriately selected from organic solvents generally used.

When the ΔSP value, which is a difference between the SP value of the amino alcohol and the SP value of the solvent, is 4.2 or more, there can be obtained coated copper particles having a particle size distribution having a narrow width such that the particle diameter of the formed coated copper particles is uniform.

The ΔSP value is 4.2 or more, and, from the viewpoint of the formation of a reaction field and the quality of the coated copper particles, the ΔSP value is preferably 4.5 or more, more preferably 5.0 or more. The upper limit of the ΔSP value is not particularly limited, and, for example, the ΔSP value is 11.0 or less, preferably 10.0 or less.

The SP value of the solvent is selected so that the ΔSP value becomes 4.2 or more. However, it is preferred that the SP value of the solvent is smaller than the SP value of the amino alcohol. The solvent preferably has an SP value of 11.0 or less, more preferably 10.0 or less. The lower limit of the SP value of the solvent is not particularly limited, and, for example, the SP value of the solvent is preferably 7.0 or more.

Further, it is preferred that the boiling point of the solvent is higher than the temperature for the thermal decomposition treatment. Specifically, the boiling point of the solvent is preferably 120° C. or higher, more preferably 130° C. or higher. The upper limit of the boiling point is not particularly limited, and, for example, the boiling point of the solvent is 400° C. or lower, preferably 300° C. or lower.

Further, it is preferred that the solvent is an organic solvent capable of forming an azeotrope together with water. When an azeotrope of the solvent with water can be formed, water formed in the reaction mixture can be easily removed from the reaction system by the thermal decomposition treatment.

Specific examples of solvents include ethylcyclohexane (boiling point: 132° C.; SP value: 8.18), C9 cyclohexane [trade name: SWACLEAN #150, manufactured by Maruzen Petrochemical Co., Ltd.](boiling point: 149° C.; SP value: 7.99), and n-octane (boiling point: 125° C.; SP value: 7.54), and preferred is at least one member selected from the group consisting of these solvents.

The solvents may be used individually or in combination.

When two or more solvents are used in combination, it is preferred that a prime solvent incompatible with the amino alcohol and a co-solvent compatible with the amino alcohol are contained. Specific examples of prime solvents are those mentioned above for the solvents.

A preferred boiling point of the co-solvent is similar to that of the prime solvent. The SP value of the co-solvent is preferably larger than that of the prime solvent, and is more preferably large such that the co-solvent is compatible with the amino alcohol. Specific examples of co-solvents include glycol ethers, such as EO glycol ethers, PO glycol ethers, and dialkyl glycol ethers. More specific examples include EO glycol ethers, such as methyl diglycol, isopropyl glycol, and butyl glycol; PO glycol ethers, such as methylpropylene diglycol, methylpropylene triglycol, propylpropylene glycol, and butylpropylene glycol; and dialkyl glycol ethers, such as dimethyl diglycol, and preferred is at least one member selected from the group consisting of these co-solvents. Any of these co-solvents are available from, for example, Nippon Nyukazai Co., Ltd.

When two or more solvents are used in combination, an SP value of the solvents is determined as an average SP value by calculation considering the SP values and molar volumes of the individual solvents contained. Specifically, when solvent 1 and solvent 2 are used in combination, an average SP value is calculated by the following equation.

$$\delta_3 = [V_1 \times \delta_1 + V_2 \times \delta_2]/(V_1 + V_2)$$

$\delta_3$: average SP value of the mixed solvent;
$\delta_1$: SP value of solvent 1; $V_1$: molar volume of solvent 1;
$\delta_2$: SP value of solvent 2; $V_2$: molar volume of solvent 2.

The amount of the solvent contained in the reaction mixture is preferably selected so that the copper ion concentration of the reaction mixture becomes 1.0 to 2.5 mol/liter, more preferably 1.5 to 2.5 mol/liter. When the copper ion concentration of the reaction mixture is 1.0 mol/liter or more, the productivity is further improved. When the copper ion concentration of the reaction mixture is 2.5 mol/liter or less, an increase of the viscosity of the reaction mixture can be suppressed, achieving excellent stirring properties.

(Complex Compound)

From the reaction mixture containing copper formate, an amino alcohol, a long-chain aliphatic carboxylic acid, and a solvent, a complex compound derived from copper formate is formed. With respect to the structure of the complex compound, there is no particular limitation, and the complex compound may contain only one type of structure or two types of structures. Further, the complex compound may be changed in the construction as the thermal decomposition treatment proceeds. That is, the complex compound mainly present at the initial stage of the thermal decomposition treatment and the complex compound mainly present at the last stage of the thermal decomposition treatment may have different constructions from each other.

The complex compound formed in the reaction mixture preferably contains a copper ion, and a formic acid ion and an amino alcohol as ligands. By virtue of containing an amino alcohol as a ligand, the thermal decomposition temperature of the complex compound is lowered.

Examples of the complex compounds formed in the reaction mixture include, specifically, a complex compound having one copper ion to which two molecules of formic acid ions and two molecules of amino alcohol coordinate, and a complex compound having one copper ion to which one molecule of formic acid ion, one molecule of aliphatic carboxylic acid, and two molecules of amino alcohol coordinate.

The complex compound formed in the reaction mixture forms metal copper by a thermal decomposition treatment. The temperature for the thermal decomposition treatment may be appropriately selected according to, for example, the structure of the complex compound. Generally, the thermal decomposition temperature of copper formate is about 220° C. However, when copper formate and an amino alcohol together form a complex compound, the thermal decomposition temperature of the compound is considered to be lowered to about 110 to 120° C., for example, as described in Japanese Unexamined Patent Publication No. 2008-013466. Therefore, the temperature for the thermal decomposition treatment is preferably 100 to 130° C., more preferably 110 to 130° C. When the temperature for the thermal decomposition treatment is 130° C. or lower, it is likely that formation of an acid amide due to a dehydration reaction of the aliphatic carboxylic acid and the amino alcohol is suppressed, so that the washing property for the obtained coated copper particles is improved.

Thermal decomposition of the complex compound forms metal copper, and the aliphatic carboxylic acid present in the reaction mixture adsorbs onto the surface of the formed metal copper, making it possible to obtain coated copper particles having a surface coated with the aliphatic carboxylic acid. The adsorption of the aliphatic carboxylic acid onto the surface of the metal copper is preferably physical adsorption. By virtue of this, the sintering property of the coated copper particles is further improved. Physical adsorption of the aliphatic carboxylic acid is promoted by suppressing the formation of copper oxide in the thermal decomposition of the complex compound.

In the thermal decomposition treatment, it is preferred that at least part of water formed due to the thermal decomposition reaction of the complex compound is removed. By removing water in the thermal decomposition treatment, the formation of copper oxide can be more efficiently suppressed.

With respect to the method for removing water, there is no particular limitation, and the method can be appropriately selected from methods generally used for removing water. For example, it is preferred that the formed water is removed in the manner of an azeotropy using, as a solvent, an organic solvent capable of forming an azeotrope together with water.

The time for the thermal decomposition treatment may be appropriately selected according to, for example, the temperature for the thermal decomposition treatment. For example, the time for the thermal decomposition treatment can be 30 to 180 minutes. Further, the atmosphere for the thermal decomposition treatment is preferably an inert atmosphere, such as a nitrogen gas atmosphere.

In the method for producing coated copper particles, as examples of factors controlling the particle size distribution of the coated copper particles formed, there can be mentioned the type and amount of the aliphatic carboxylic acid added, the concentration of the copper formate complex, and the ratio for the mixed solvent (prime solvent/co-solvent). The factor controlling the size of the coated copper particles can be made constant by appropriately maintaining the temperature increase rate determining the number of the metal nuclei generated, i.e., the amount of heat introduced into the reaction system, and the stirring speed related to the size of the micro-reaction field.

The method for producing coated copper particles is advantageous in that, by performing an easy operation of preparing a reaction mixture containing copper formate, an amino alcohol, an aliphatic carboxylic acid, and a solvent and subjecting the reaction mixture to thermal decomposition treatment at a desired temperature, coated copper particles having a uniform particle diameter and having excellent oxidation resistance and excellent sintering property can be efficiently produced.

In the method for producing coated copper particles, coated copper particles having a narrow particle size distribution are obtained. The reason for this can be considered, for example, as follows.

Specifically, a difference in SP value between the amino alcohol, which is a complexing agent for solubilizing copper formate in the reaction solvent, and the solvent, i.e., a $\Delta SP$ value is 4.2 or more, and therefore copper formate is dissolved in the state of a copper formate-amino alcohol complex, or the copper formate-amino alcohol complex having one molecule of formic acid replaced by an aliphatic carboxylic acid, but, when the complex undergoes thermal decomposition to liberate the amino alcohol as a complexing agent, the liberated amino alcohol is incompatible with the solvent and starts to form two phases. The liberated amino alcohol has a high affinity with copper formate and the copper formate-amino alcohol complex, and therefore serves as a new complexing agent or solvent for copper formate to form an inner nucleus (droplet) having a high polarity, so that the solvent having a low polarity surrounds the outer surface of the inner nucleus to form a two-phase structure that is like a water-in-oil emulsion, which is presumed to function as a micro-reaction field.

Further, the water in the reaction system and the formic acid eliminated due to replacement by the aliphatic carboxylic acid are present in the micro-reaction field. A reaction proceeds in a state such that the metal nuclei, particles grown from the metal nuclei, the copper formate-amino alcohol complex which is a source of generation of the metal nuclei, the copper formate-amino alcohol complex having one molecule of formic acid replaced by the aliphatic carboxylic acid, water, and formic acid are isolated in the micro-reaction field. As the aliphatic carboxylic acid is fixed as a coating material for the metal copper grown particles and reduced, the thermal decomposition mechanism for the copper formate complex proceeds according to the below-mentioned reaction formulae 1 to 3 at the initial stage of the reaction, and subsequently the mechanism of reaction formula 4 proceeds so that the gas component generated is changed. In the micro-reaction field, CuO is formed due to a hydrolysis of the copper formate-amino alcohol complex by water shown in reaction formula 5, but is reduced again through a reaction of reaction formula 6 or reaction formula 7, making it possible to produce reduced copper particles free of copper(I) oxide and copper(II) oxide. Further, the number of copper atoms contained in the micro-reaction field is limited, and therefore the particle diameter of the formed copper particles is controlled to be constant.

It is considered that copper particles having no copper oxide formed on the surface thereof are formed in the micro-reaction field, and therefore the aliphatic carboxylic acid present in the micro-reaction field is likely to physically adsorb on the copper particles, so that coated copper particles having a uniform particle diameter and having excellent oxidation resistance and excellent sintering property can be efficiently obtained.

The method for producing coated copper particles may further have, for example, a washing step, a separating step, and a drying step for the obtained coated copper particles after the thermal decomposition treatment. As an example of a washing step for the coated copper particles, there can be mentioned a washing step using an organic solvent. Examples of organic solvents used in the washing step include alcohol solvents, such as methanol, and ketone solvents, such as acetone. These organic solvents may be used individually or in combination.

<Coated Copper Particle>

The coated copper particle according to the present embodiment is produced by the above-described method for producing coated copper particles, and has an average primary particle diameter $D_{SEM}$ of 0.02 to 0.2 μm, as determined by a SEM examination, wherein a value of a coefficient of variation of the particle size distribution (standard deviation SD/average primary particle diameter $D_{SEM}$) is 0.1 to 0.5.

The coated copper particle is produced by the above-described method for producing coated copper particles, and therefore has a small coefficient of variation of the particle size distribution such that the particle diameter is uniform. The coated copper particles having a small coefficient of variation of the particle size distribution can achieve an effect that a dispersion of the coated copper particles having excellent dispersibility and having a high concentration can be easily prepared.

The coated copper particle according to the present embodiment is obtained by the above-described method for producing coated copper particles, and has a $D_{XRD}/D_{SEM}$ ratio of 0.25 to 1.00 wherein the $D_{XRD}/D_{SEM}$ ratio is a ratio of a crystal particle diameter $D_{XRD}$, as determined by a powder X-ray analysis, to an average primary particle diameter $D_{SEM}$, as determined by a SEM examination. The coated copper particle is produced by the above-described method for producing coated copper particles, and therefore can be reduced in a difference between the crystal particle diameter and the average primary particle diameter. Accordingly, an effect can be obtained such that the coated copper particle exhibits excellent oxidation resistance, and consequently, is further improved in the sintering property.

The coated copper particle according to the present embodiment is obtained by the above-described method for producing coated copper particles, and therefore the surface of the copper particle is coated with an aliphatic carboxylic acid. The aliphatic carboxylic acid coating the copper particle is a coating material which is localized on the surface of the copper particles to suppress oxidation or aggregation of the copper particles, and is removed from the surface of the particles during the sintering, and further decomposes or volatilizes at the sintering temperature or lower, and hence is prevented from remaining in the copper film formed by sintering. The reason for this is presumed that, for example, the aliphatic carboxylic acid physically adsorbs on the surface of the copper particles. Further, the copper particles constituting the coated copper particles have a uniform particle diameter, and therefore have excellent dispersibility. Furthermore, a difference between the diameter of the crystal particles constituting the copper particles and the diameter determined by a SEM examination is small, and therefore a plurality of the copper particles in an aggregate form do not constitute the coated copper particles, and inhibition of sintering caused due to the coating material, impurities, oxide layer and others present at boundary portions of the particles in an aggregate form is prevented.

<Conductive Composition>

The conductive composition according to the present embodiment comprises at least one type of the coated copper particles obtained by the above-described method for producing coated copper particles, and a medium. The conductive composition can be advantageously used in forming a wiring pattern, and a wiring pattern having excellent conductivity can be easily formed at low temperatures from the conductive composition.

That is, the present embodiment encompasses the use of the above-mentioned coated copper particles as a conductive composition.

The constitution of the medium contained in the conductive composition can be appropriately selected according to, for example, the purpose of the conductive composition.

For example, when the conductive composition is for use in screen printing, examples of media include hydrocarbon solvents, higher alcohol solvents, cellosolve, and cellosolve acetate solvents.

The solids content of the conductive composition for screen printing can be, for example, 40 to 95% by mass. The term "solids" of the conductive composition means a total amount of nonvolatile components.

Further, for example, when the conductive composition is for use in inkjet printing, examples of media include hydrocarbon solvents, higher alcohol solvents, cellosolve, and cellosolve acetate solvents.

The solids content of the conductive composition for inkjet printing can be, for example, 40 to 90% by mass.

The conductive composition, if necessary, can further contain another additive, in addition to the coated copper particles and medium. Examples of other additives include coupling agents, such as a silane coupling agent and a titanate coupling agent, and dispersants, such as a polyester dispersant and a polyacrylic acid dispersant.

<Circuit Formed Article>

The circuit formed article according to the present embodiment comprises a substrate, and a wiring pattern which is disposed on the substrate, and which is a thermal treatment product of the above-mentioned conductive composition. The wiring pattern is formed from the above-mentioned conductive composition, and therefore the conductivity of the wiring pattern is excellent. Further, the wiring pattern can be formed at low temperatures, and hence the freedom of selection of the substrate is large.

Examples of materials for the substrate include a polyimide film, glass, a ceramic, and a metal. With respect to the thickness of the substrate, there is no particular limitation, and the thickness of the substrate can be appropriately selected according to, for example, the purpose. The thickness of the substrate can be, for example, 0.01 to 5 mm.

The formation of a wiring pattern can be made by, for example, applying the conductive composition onto a substrate so as to form a desired pattern, and subjecting the applied conductive composition to thermal treatment. By virtue of using the conductive composition, a wiring pattern having a desired pattern and having excellent conductivity can be efficiently formed at low temperatures.

The circuit formed article can be produced by a method for producing a circuit formed article, which comprises, for example, the steps of providing a substrate, applying the conductive composition onto a substrate, and subjecting the applied conductive composition to thermal treatment. That is, the present embodiment encompasses a method for producing a circuit formed article using the above-mentioned conductive composition.

With respect to the method for applying the conductive composition, there is no particular limitation, and the conductive composition can be applied by, for example, an inkjet printing method, a screen printing method, a flexographic printing method, or a dispense method. The amount of the conductive composition applied can be appropriately selected according to, for example, the purpose, and, for example, can be selected so that the thickness of the conductive composition obtained after the thermal treatment becomes 1 to 100 m.

The temperature for the thermal treatment of the conductive composition can be, for example, 200 to 600° C., preferably 250 to 450° C.

The time for the thermal treatment can be, for example, 1 to 120 minutes, preferably 5 to 60 minutes.

The atmosphere for the thermal treatment is preferably a low oxygen-concentration atmosphere. Examples of low oxygen-concentration atmospheres include a nitrogen gas atmosphere and an argon gas atmosphere. Further, the oxygen concentration of the atmosphere for the thermal treatment is preferably 1,000 ppm or less.

EXAMPLES

Hereinbelow, the present invention will be described in more detail with reference to the following Examples, which should not be construed as limiting the scope of the present invention.

Details of the test methods used in the following Examples are shown below.
<Calculation of an Average Primary Particle Diameter and a Variation>
Measurement apparatus: FE-EPMA JXA-8510F, manufactured by JEOL LTD.
Average primary particle diameter: Average value for 20 samples
Variation: Value calculated from (standard deviation/average value) for 20 samples
   <SEM Examination Image>
Measurement apparatus: FE-EPMA JXA-8510F, manufactured by JEOL LTD.
Conditions for measurement:
   Accelerating voltage: 6 KV or 15 KV
   Magnification for examination: ×10,000 to ×75,000
   <Measurement of Powder X-Ray Diffraction (XRD)>
Measurement apparatus: XRD-6100, manufactured by Shimadzu Corporation
Conditions for measurement:
   Target: Cu
   Tube voltage: 40 KV; Tube current: 30.0 mA
   <Measurement of Tof-SIMS (Time-of-Flight Secondary Ion Mass Spectrometer)>
Measurement apparatus: PHI TRIFT IV type, manufactured by ULVAC-PHI, Inc.
Conditions for measurement:
   Primary ion species: Au
   Accelerating voltage: 30 KV
   <TG-DTA Measurement>
Measurement of an organic residue content and a metal content
Measurement apparatus: TG8120, manufactured by Rigaku Corporation
Temperature increase rate: 10° C./min
Temperature range for measurement: 25 to 600° C.
Atmosphere for measurement: Nitrogen, 100 ml/min <Particle Size Distribution Measurement>
Measurement of laser diffraction scattering-type particle size distribution
Measurement apparatus: LA-960, manufactured by Horiba, Ltd.
Solvent for measurement: KYOWANOL M
Dispersant: Polyacrylic acid dispersant
Dispersing method: Ultrasonic waves, 5 minutes
   <Electric Resistance Value Measurement>
Measurement of a volume resistivity value
Measurement apparatus: K-705RS, manufactured by Kyowa Riken Co., Ltd.
Measurement method: Four-terminal measurement method
Number of points measured: Average for n=5
Thickness of a conductive film: Determined by examination of a cross-section under a SEM
   <Uppermost Surface Compositional Analysis and Depth Profile Analysis by XPS>
Measurement apparatus: JPS-9010MX, manufactured by JEOL LTD.
High-speed etching ion gun: XP-HSIG3
Conditions for Depth Profile analysis
Ion beam diameter: $\phi$15 mm
Ar ion accelerating voltage: 500 V (current: 8.6 mA), which corresponds to a SiO etching rate of 20 to 25 nm/min
(The direction of from Data_0 to Data_6 corresponds to the direction of from the bottom to the top.)
Data_0: No etching
Data_1: Execution etching time: 0.9 second (total: 0.9 second)
Data_2: Execution etching time: 3.0 seconds (total: 3.9 seconds)
Data_3: Execution etching time: 3.0 seconds (total: 6.9 seconds)
Data_4: Execution etching time: 3.0 seconds (total: 9.9 seconds)
Data_5: Execution etching time: 3.0 seconds (total: 12.9 seconds)
Data_6: Execution etching time: 3.0 seconds (total: 15.9 seconds)

Reference Example 1

An example of the production of the copper formate and copper formate anhydride used in the present Examples is shown below, but a plurality of methods for producing copper formate have been known, and copper formate produced by the other method may be used.

[Pretreatment for Basic Copper Carbonate]

When basic copper carbonate contains a portion in an aggregate form, such a portion is likely to remain unreacted. Therefore, the basic copper carbonate was treated using an about 28 mesh sieve.

[Procedure for Synthesis]

0.96 kg of formic acid and 1.44 kg of ion-exchanged water were placed in a 5-liter four-neck flask and, while uniformly stirring the resultant mixture, basic copper carbonate was added portion by portion to the mixture. All of the basic copper carbonate was added while taking care of the generation of carbon dioxide gas. After completion of the addition, the temperature of the mixture was increased to 60° C. to effect a reaction for 0.5 hour. At a point in time when almost no carbon dioxide gas flown out of the flask (which is checked by introducing the drain to a water trap) was confirmed, part of the copper formate and basic copper carbonate remained undissolved. 1.60 kg of ion-exchanged water was further added to the resultant mixture to effect a reaction at 60° C. for another 1.0 hour. After confirming that the reaction mixture was deep blue and transparent, the reaction was terminated, and the reaction mixture was subjected to vacuum evaporation using an evaporator to remove 1.5 liters of water. At that time, crystals had already been deposited, so that the mixture was in a shiny form.

The mixture was cooled to room temperature, and the reaction product was separated by filtration, and washed with one liter of acetone. The obtained crystals were colored with greenish blue.

Then, drying dehydration was conducted as follows. The drying dehydration was performed at a drying temperature of 80° C. or lower (temperature of the powder) in a vacuum at 0.5 KPa (finally). The drying dehydration caused the crystals to be light blue.

Thermal decomposition temperature of copper formate: 214.9° C. (in nitrogen), about 200° C. in air

[Quality Check]

The TG-DTA measurement was made to confirm that the contained Cu % approximated to the theoretical value.
Formula weight of copper formate anhydride: 153.84
Contained Cu %=41.3%, Loss %=about 58.5%

Example 1

A 3,000 mL four-neck glass flask equipped with a stirrer, a thermometer, a reflux condenser, a 75 mL Dean-Stark tube, and a nitrogen introducing tube was set in an oil bath. 484 g (3.1 mop of copper formate anhydride, 68.1 g of lauric acid (manufactured by Kanto Chemical Co., Inc.) (0.11 equivalent/copper formate anhydride), 150 g of tripropylene glycol monomethyl ether as a reaction solvent (manufactured by Tokyo Chemical Industry Co., Ltd.) (0.23 equivalent/copper formate anhydride), and 562 g of SWACLEAN 150 (manufactured by Godo Co., Ltd.) (1.42 equivalent/copper formate anhydride) were placed in the flask, and mixed with one another while stirring at 200 rpm. The resultant mixture was heated in a nitrogen gas atmosphere while stirring at 200 rpm until the temperature of the mixture became 50° C. To the mixture was added dropwise slowly 712 g of 3-amino-1-propanol (manufactured by Tokyo Chemical Industry Co., Ltd.) (3.00 equivalents/copper formate anhydride). After completion of the addition, the resultant mixture was heated while stirring at 340 mm until the temperature of the mixture became about 120° C. The aqueous layer trapped by the Dean-Stark tube was removed with appropriate timing so as not to be returned to the reaction system. As the temperature increased, the reaction mixture started changing in color from deep blue to brown and bubbles of carbon dioxide gas were generated. A time when the generation of bubbles of carbon dioxide gas was ended was determined as a reaction end point, and the temperature control using an oil bath was stopped, so that the reaction mixture was cooled to room temperature.

After cooling to room temperature, 550 g of methanol (manufactured by Kanto Chemical Co., Inc.) was added to and mixed with the reaction mixture. The resultant mixture was allowed to stand for 30 minutes or longer, and the resultant supernatant was removed by decantation to obtain a precipitate. To the precipitate were added 550 g of methanol (manufactured by Kanto Chemical Co., Inc.) and 300 g of acetone (manufactured by Kanto Chemical Co., Inc.), followed by mixing with one another. The resultant mixture was allowed to stand for 30 minutes or longer, and the resultant supernatant was removed by decantation to obtain a precipitate, and this operation was repeated once. The resultant precipitate was transferred to a 500 mL eggplant-shaped flask while washing the precipitate using 550 g of methanol (manufactured by Kanto Chemical Co., Inc.). After allowed to stand for 30 minutes or longer, the resultant supernatant was removed by decantation, and the obtained precipitate was set to a rotary evaporator and subjected to vacuum drying at 40° C. under 1 kPa or less. After completion of the vacuum drying, the precipitate was cooled to room temperature, and the reduced pressure was increased by introducing nitrogen gas, obtaining 194 g of brown coated copper particles.

Figure 7:
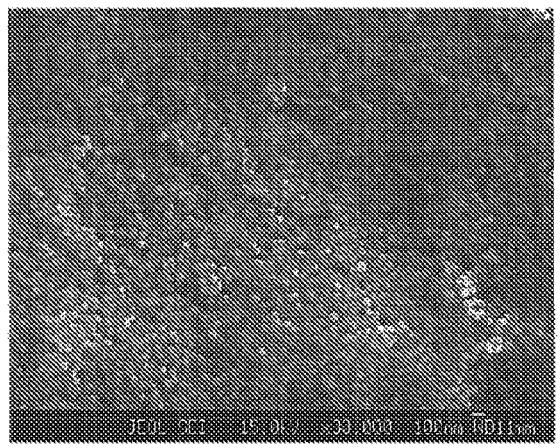
FIG. 7 A SEM examination image of the coated copper particles prepared in Example 1.
Figure 20A:
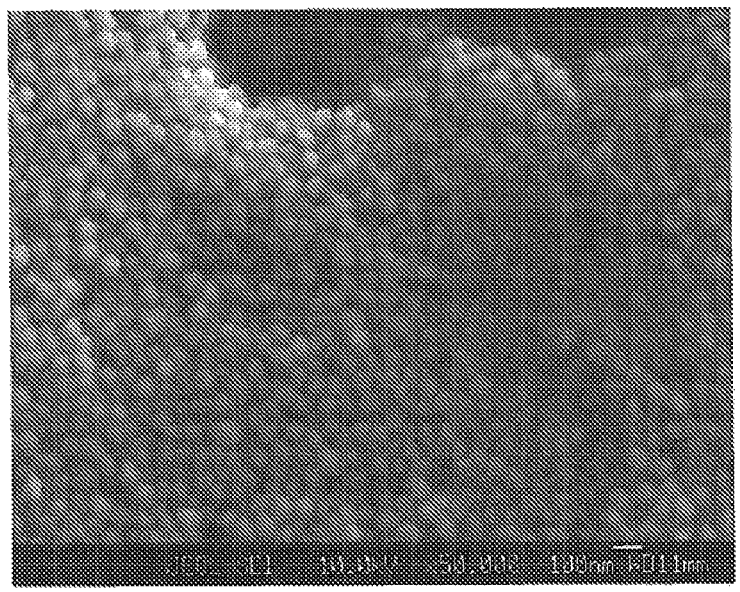
FIG. 20A An enlarged SEM examination image of the coated copper particles prepared in Example 1.
Figure 20B:
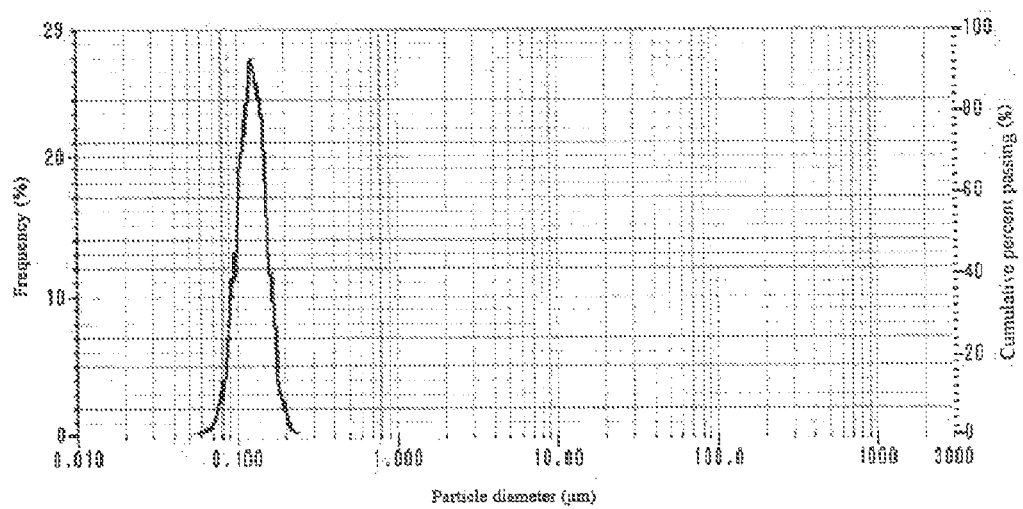
FIG. 20B Particle size distribution measurement data of the coated copper particles prepared in Example 1.

A SEM examination image of the obtained coated copper particles is shown in FIG. 7. Further, an enlarged SEM examination image is shown in FIG. 20A, and a particle size distribution is shown in FIG. 20B.

Example 2

Coated copper particles were synthesized in substantially the same manner as in Example 1 except that 3-amino-1-propanol was changed to DL-1-amino-2-propanol.

Figure 8:
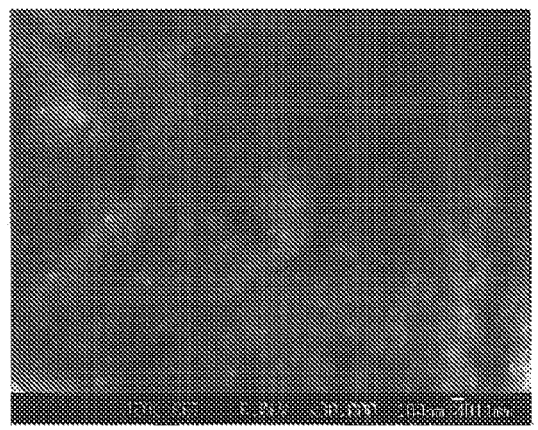
FIG. 8 A SEM examination image of the coated copper particles prepared in Example 2.

A SEM examination image of the obtained coated copper particles is shown in FIG. 8.

Example 3

Coated copper particles were synthesized in substantially the same manner as in Example 1 except that 3-amino-1-propanol was changed to 5-amino-1-pentanol, and that the reaction solvent was changed to n-octane.

Example 4

Coated copper particles were synthesized in substantially the same manner as in Example 1 except that 3-amino-1-propanol was changed to DL-1-amino-2-propanol, and that the reaction solvent was changed to n-octane.

Figure 9:
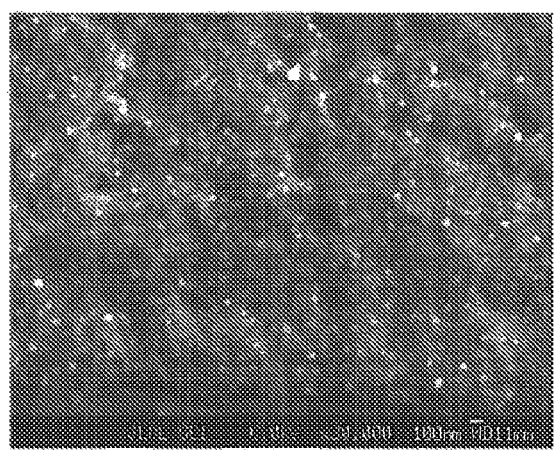
FIG. 9 A SEM examination image of the coated copper particles prepared in Example 4.

A SEM examination image of the obtained coated copper particles is shown in FIG. 9.

Comparative Example 1

Coated copper particles were synthesized in substantially the same manner as in Example 1 except that 3-amino-1-propanol was changed to 1-hexylamine.

Figure 10:
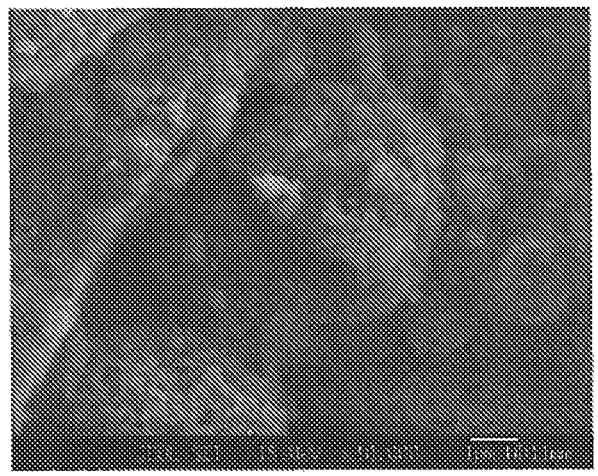
FIG. 10 A SEM examination image of the coated copper particles prepared in Comparative Example 1.

A SEM examination image of the obtained coated copper particles is shown in FIG. 10.

Comparative Example 2

Coated copper particles were synthesized in substantially the same manner as in Example 1 except that 3-amino-1-propanol was changed to 2-diethylaminoethanol.

Figure 11:
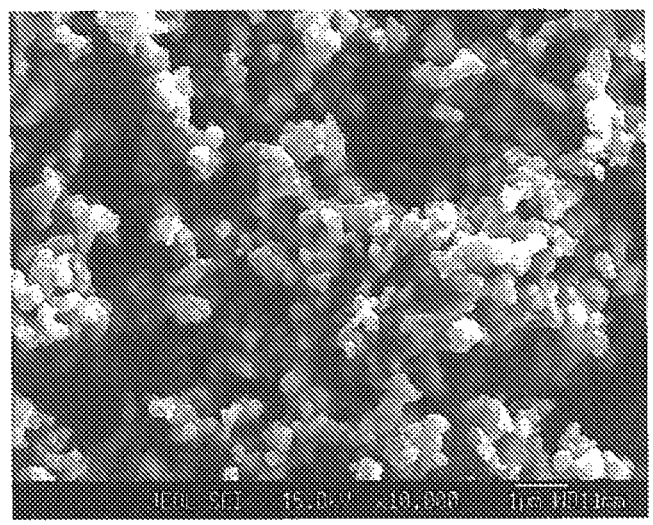
FIG. 11 A SEM examination image of the coated copper particles prepared in Comparative Example 2.

A SEM examination image of the obtained coated copper particles is shown in FIG. 11.

Comparative Example 3

Coated copper particles were synthesized in substantially the same manner as in Example 1 except that 3-amino-1-propanol was changed to 2-dimethylaminoethanol.

Figure 12:
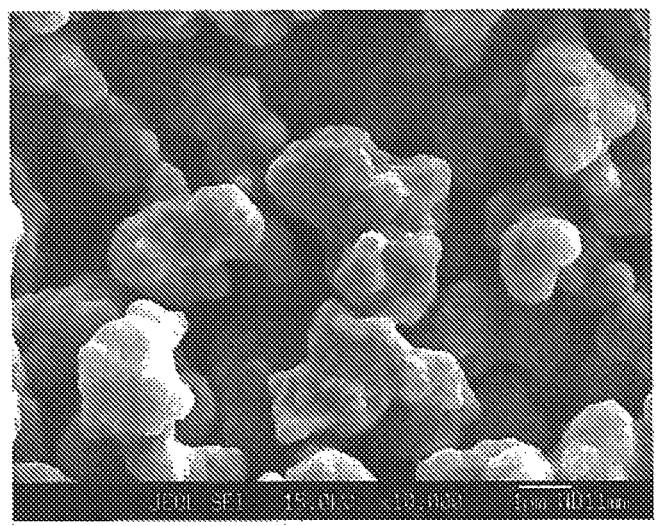
FIG. 12 A SEM examination image of the coated copper particles prepared in Comparative Example 3.

A SEM examination image of the obtained coated copper particles is shown in FIG. 12.

Comparative Example 4

Coated copper particles were synthesized in substantially the same manner as in Example 1 except that 3-amino-1-propanol was changed to 5-amino-1-pentanol.

Figure 13:
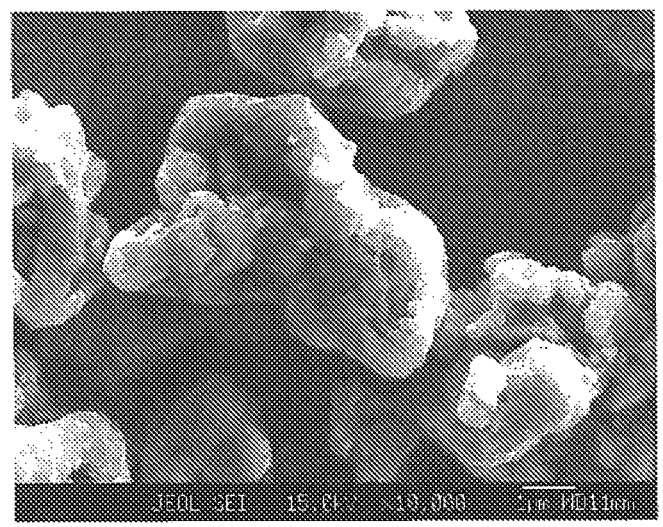
FIG. 13 A SEM examination image of the coated copper particles prepared in Comparative Example 4.

A SEM examination image of the obtained coated copper particles is shown in FIG. 13.

Comparative Example 5

Coated copper particles were synthesized in substantially the same manner as in Example 1 except that the reaction solvent was changed to n-octanol.

Figure 14:
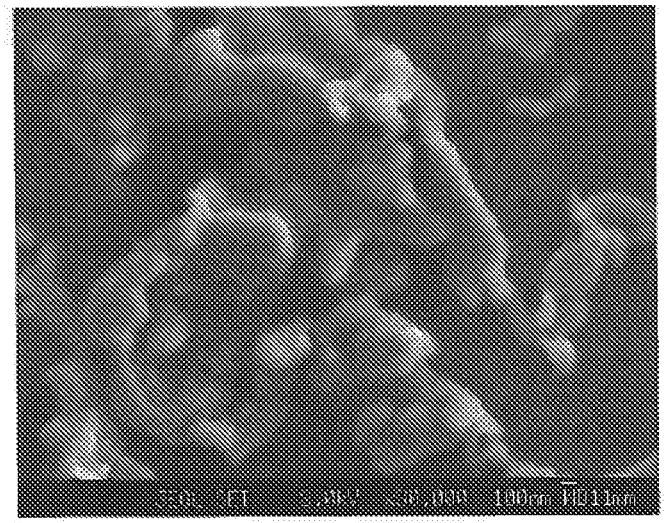
FIG. 14 A SEM examination image of the coated copper particles prepared in Comparative Example 5.

A SEM examination image of the obtained coated copper particles is shown in FIG. 14.

Examples in which the type and amount of the long-chain aliphatic carboxylic acid were changed are shown below.

Example 5

Coated copper particles were synthesized in substantially the same manner as in Example 1 except that lauric acid was changed to 68.16 g of oleic acid, that a co-solvent was not used as a solvent, and that the amount of SWACLEAN #150 was changed to 712 g.

Figure 15:
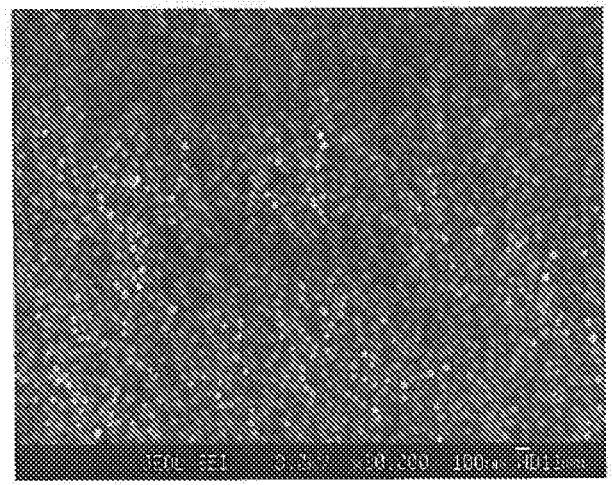
FIG. 15 A SEM examination image of the coated copper particles prepared in Example 5.

A SEM examination image of the obtained coated copper particles is shown in FIG. 15.

Example 6

Coated copper particles were synthesized in substantially the same manner as in Example 1 except that the amount of lauric acid was changed from 48 g to 16 g.

Figure 16A:
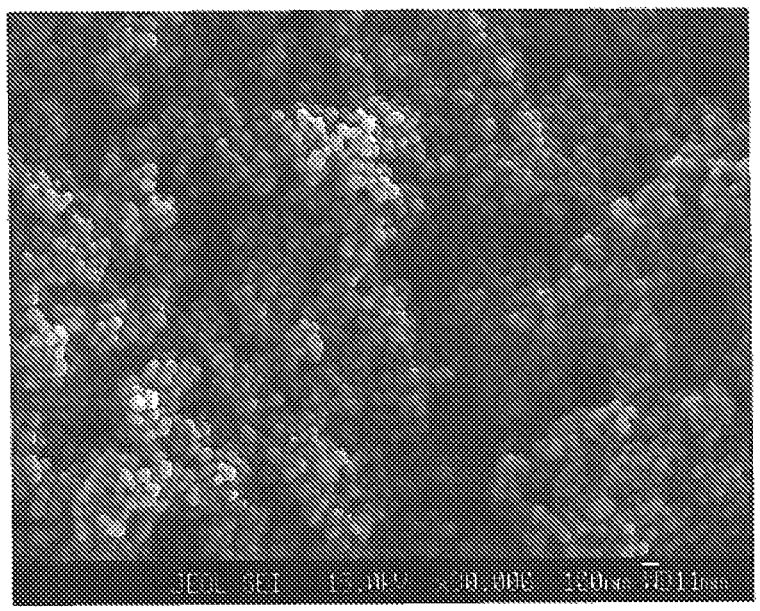
FIG. 16A A SEM examination image of the coated copper particles prepared in Example 6.
Figure 16B:
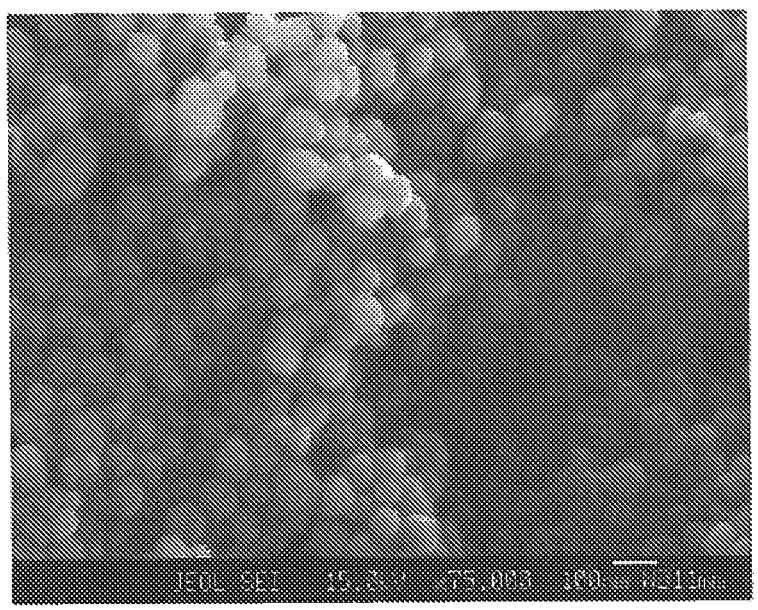
FIG. 16B An enlarged SEM examination image of the coated copper particles prepared in Example 6.

SEM examination images of the obtained coated copper particles are shown in FIGS. 16A and 16B.

Example 7

Coated copper particles were synthesized in substantially the same manner as in Example 1 except that the amount of lauric acid was changed from 48 g to 144 g.

Figure 17A:
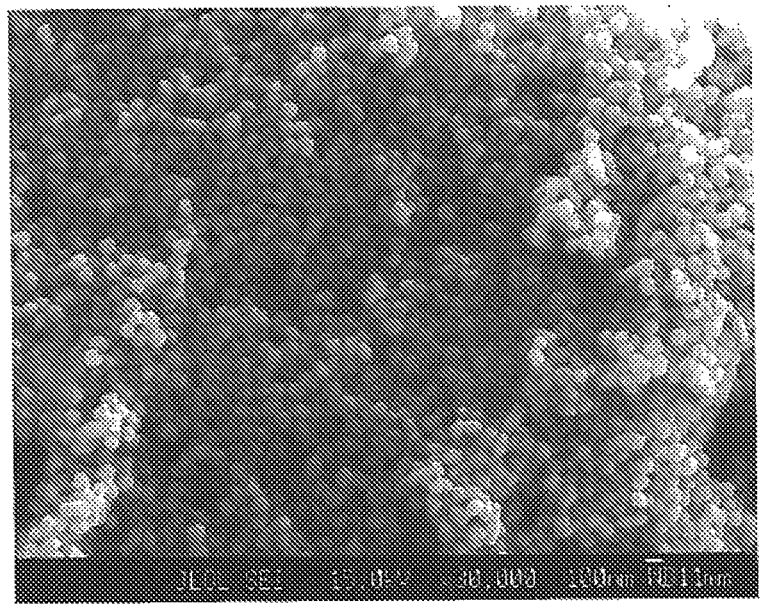
FIG. 17A A SEM examination image of the coated copper particles prepared in Example 7.
Figure 17B:
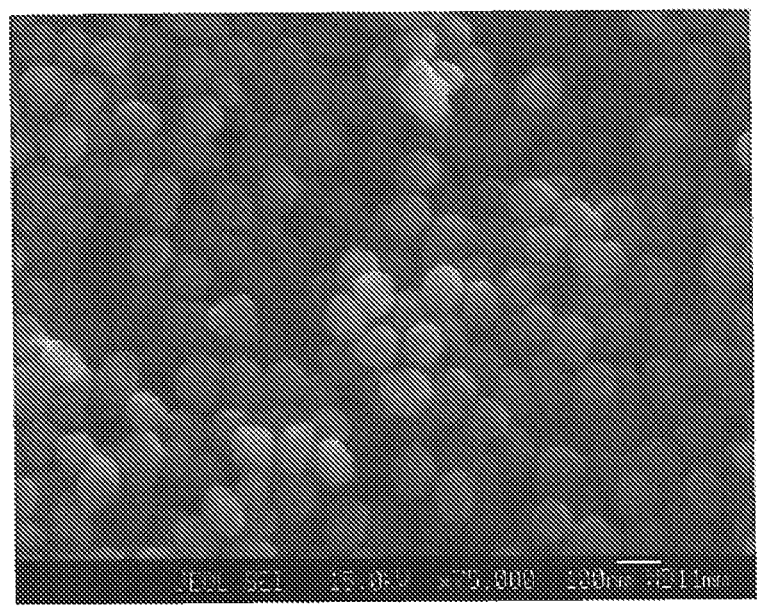
FIG. 17B An enlarged SEM examination image of the coated copper particles prepared in Example 7.

SEM examination images of the obtained coated copper particles are shown in FIGS. 17A and 17B.

Example 8

Coated copper particles were synthesized in substantially the same manner as in Example 1 except that the reaction solvent was changed to 150 g of SWACLEAN #150 and 562 g of methylpropylene triglycol.

Figure 18A:
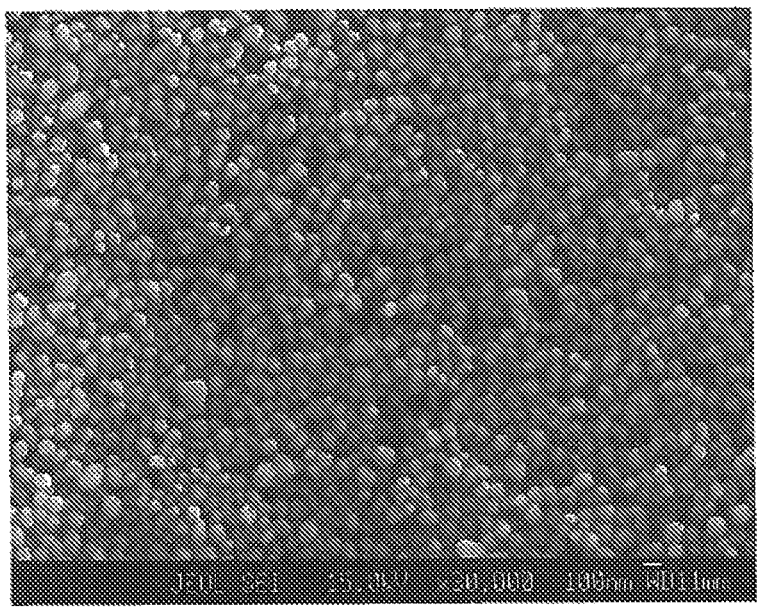
FIG. 18A A SEM examination image of the coated copper particles prepared in Example 8.
Figure 18B:
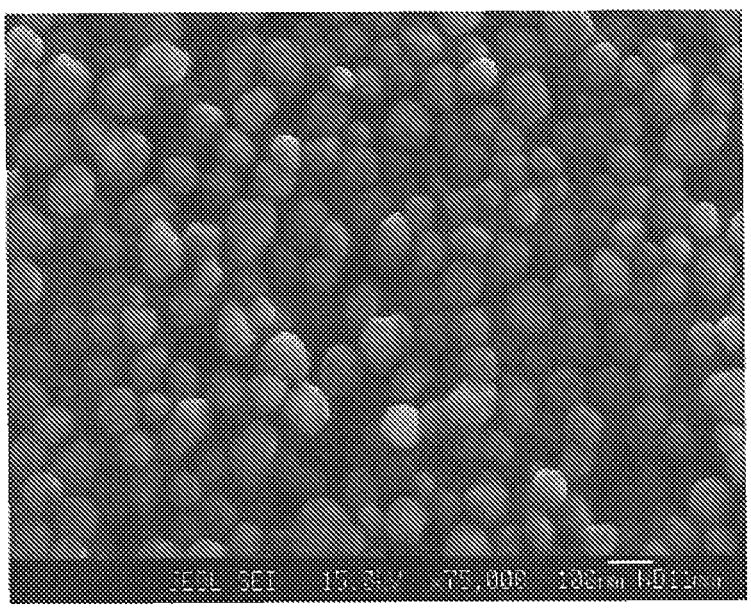
FIG. 18B An enlarged SEM examination image of the coated copper particles prepared in Example 8.

SEM examination images of the obtained coated copper particles are shown in FIGS. 18A and 18B.

Example 9

Coated copper particles were synthesized in substantially the same manner as in Example 1 except that lauric acid was changed to octanoic acid.

Figure 19A:
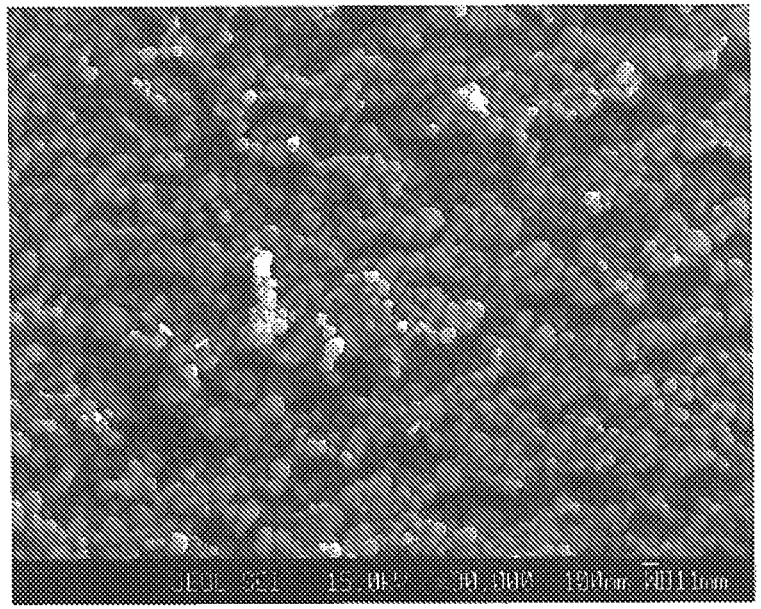
FIG. 19A A SEM examination image of the coated copper particles prepared in Example 9.
Figure 19B:
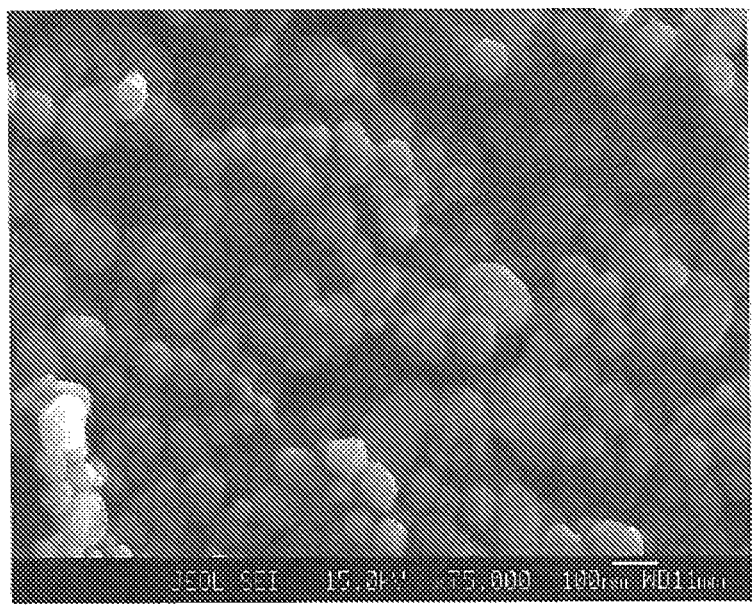
FIG. 19B An enlarged SEM examination image of the coated copper particles prepared in Example 9.

SEM examination images of the obtained coated copper particles are shown in FIGS. 19A and 19B.

Comparative Example 6

Coated copper particles were synthesized in accordance with the method described in Example 1 of Japanese Unexamined Patent Publication No. 2013-047365. Specifically, coated copper particles were synthesized using acetic acid as a coating material as described below.

14.3 g (0.1 mol) of copper(I) oxide (manufactured by Furukawa Chemicals Co., Ltd.; particle diameter: 2 to 4μ) as a copper compound, 3.0 g (50 mmol) of acetic acid as a coating material, 5.0 g (0.1 mol) of hydrazine hydrate (manufactured by Wako Pure Chemical Industries, Ltd.) as a reducing agent, and 100 ml of isopropanol as a solvent were mixed and placed in a 300 ml four-neck flask. The flask was equipped with a condenser, a thermometer, a nitrogen introducing tube, and a stirrer. The temperature of the resultant mixture was increased to 70° C. while stirring and passing nitrogen gas at 200 ml/min through the flaks, and heating and stirring were continued for one hour to reduce copper(I) oxide, obtaining a coated copper particle dispersion.

The obtained coated copper particle dispersion was subjected to filtration under a reduced pressure using Kiriyama filter paper No. 5B to separate a powder. The separated powder was washed with methanol (manufactured by Kanto Chemical Co., Inc.) three times, and subjected to vacuum drying at 40° C. under 1 kPa or less, and cooled to room temperature, and then removed after introducing nitrogen gas into the vacuum, obtaining 12 g of a brown powder.

Figure 21:
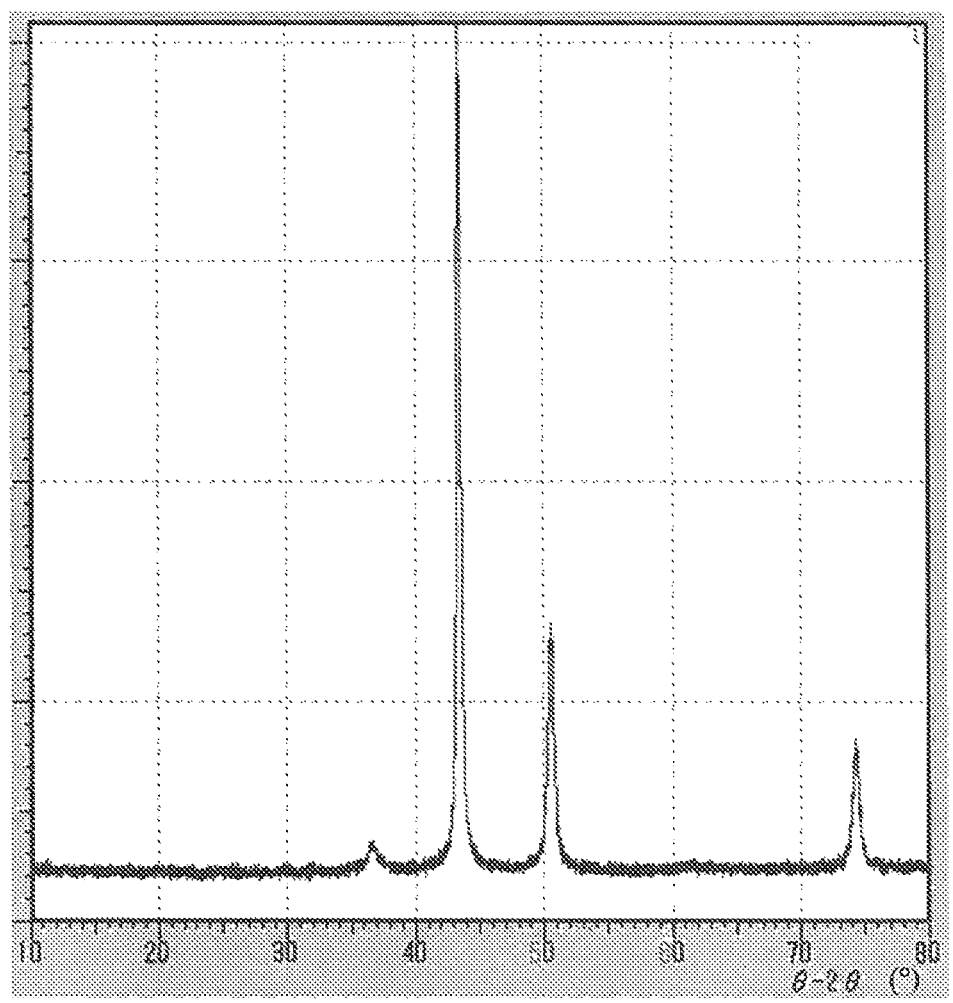
FIG. 21 XRD data of the coated copper particles prepared in Comparative Example 6.

With respect to the obtained powder, an XRD measurement was conducted (shown in FIG. 21). As a result, copper(I) oxide believed to be derived from the raw material was slightly detected.

Figure 23A:
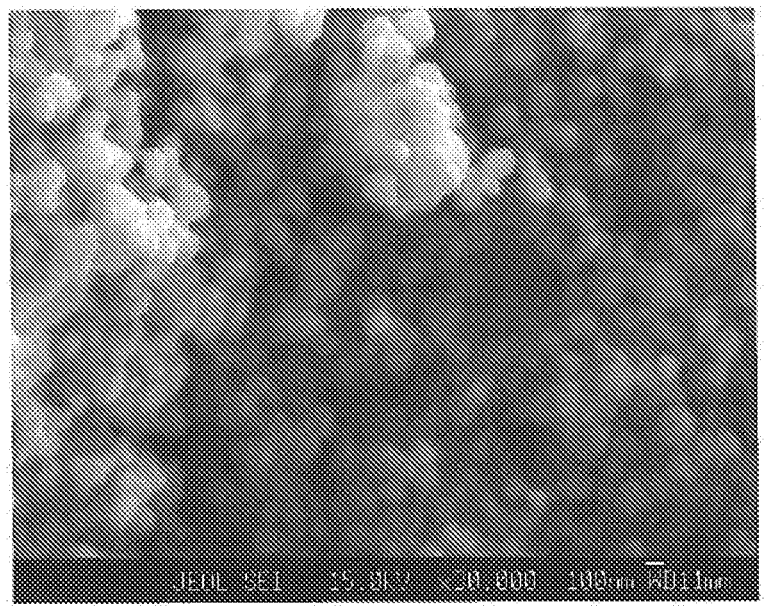
FIG. 23A A SEM examination image of the coated copper particles prepared in Comparative Example 6.
Figure 23B:
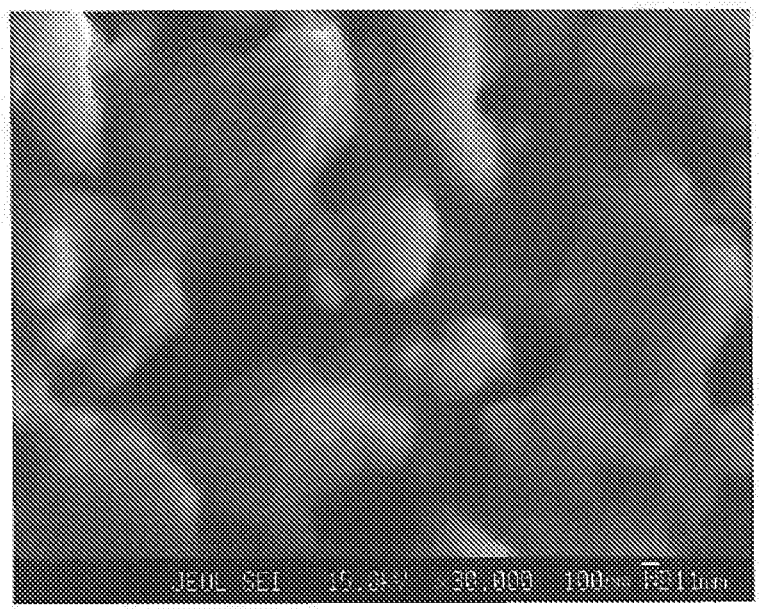
FIG. 23B A SEM examination image of a sintered film which is obtained by preparing a paste of the coated copper particles prepared in Comparative Example 6 and calcining the paste in a nitrogen gas atmosphere at 500° C. for one hour.

A SEM examination image of the obtained coated copper particles is shown in FIG. 23A.

Comparative Example 7

Coated copper particles were synthesized by a method in which Comparative Example 6 is scaled up and the reaction time is increased twice. 71.5 g (0.5 mol) of copper(I) oxide (manufactured by Furukawa Chemicals Co., Ltd.) as a copper compound, 15.0 g (250 mmol) of acetic acid as a coating material, 25.0 g (0.5 mol) of hydrazine hydrate (manufactured by Wako Pure Chemical Industries, Ltd.) as a reducing agent, and 500 ml of isopropanol as a solvent were mixed and placed in a 1,000 ml four-neck flask. The flask was equipped with a condenser, a thermometer, a nitrogen introducing tube, and a stirrer. The temperature of the resultant mixture was increased to 70° C. while stirring and passing nitrogen gas at 200 ml/min through the flaks, and heating and stirring were continued for 2 hours to reduce copper(I) oxide, obtaining a coated copper particle dispersion.

The obtained coated copper particle dispersion was subjected to filtration under a reduced pressure using Kiriyama filter paper No. 5B to separate a powder. The separated powder was washed with methanol (manufactured by Kanto Chemical Co., Inc.) three times, and subjected to vacuum drying at 40° C. under 1 kPa or less, and cooled to room temperature, and then removed after introducing nitrogen gas into the vacuum, obtaining 62 g of a brown powder.

Figure 22:
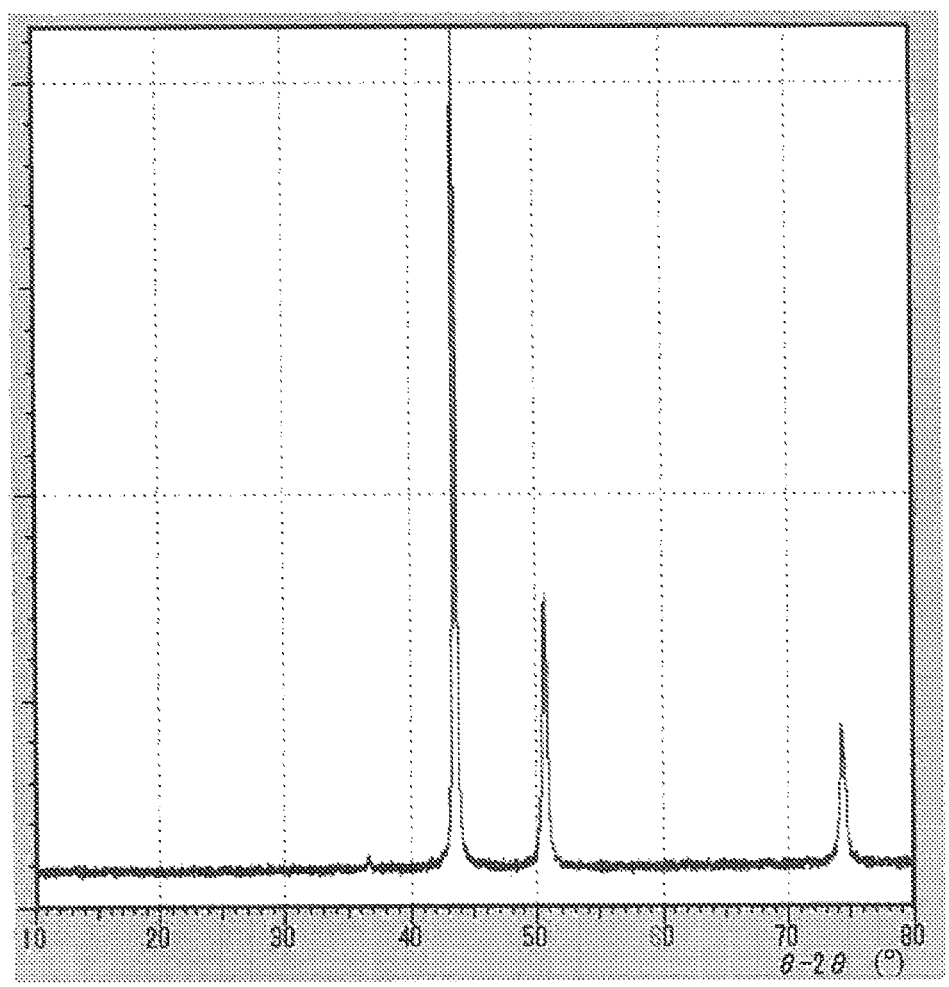
FIG. 22 XRD data of the coated copper particles prepared in Comparative Example 7.

With respect to the obtained powder, an XRD measurement was conducted (shown in FIG. 22). As a result, it was found that copper(I) oxide as a raw material was stoichiometrically converted to reduced copper.

Figure 26A:
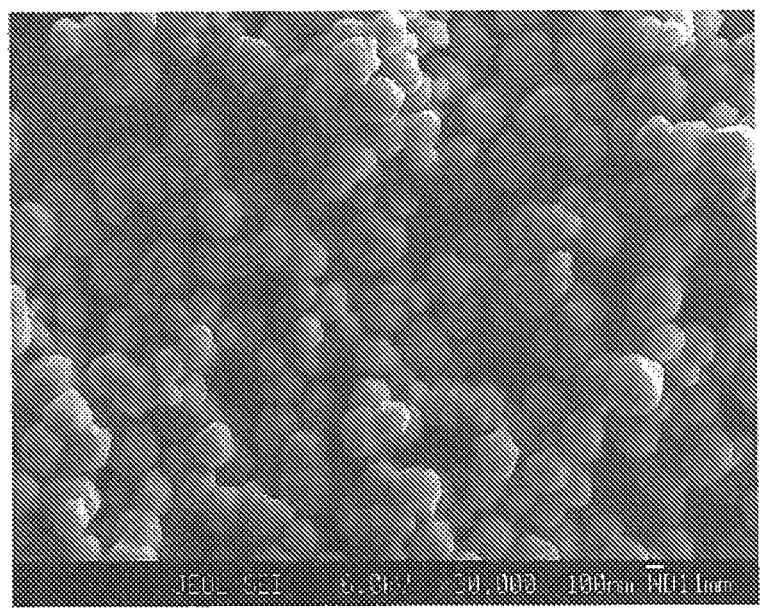
FIG. 26A A SEM examination image of the coated copper particles prepared in Comparative Example 7.

A SEM examination image of the obtained coated copper particles is shown in FIG. 26A.

<Evaluation>

For clarifying the composition of the coated copper particles coated with an aliphatic carboxylic acid, a powder X-ray analysis, a SEM examination, a Tof-SIMS surface analysis, and a TG-DTA measurement were conducted using the coated copper particles produced in Example 1.

For examining the structure of the nucleus and the particle diameter of the coated copper particles produced in Example 1, a powder X-ray analysis was conducted. As seen from the results of the powder X-ray analysis (FIG. 1A), a peak derived from reduced copper (2θ=around 43.3°) was detected, and copper oxide (2θ=35.5° and) 38.7° and copper (I) oxide (2θ=around 37.0°) were not detected. From this result, it is found that the coated copper particle according to the present embodiment has no oxide layer and has a nucleus formed from reduced copper.

A crystal particle diameter was determined by making a calculation using the Scherrer's equation from an angle of diffraction of powder X-ray and a half band width. The Scherrer's equation is represented by the following formula (1).

$$D=K\lambda/(\beta \cos \theta) \quad (1)$$

In the above formula, D is a crystal particle diameter, K is a Scherrer's constant (K=1 is substituted on the assumption that the crystal is a sphere), λ is a wavelength of the X-ray for measurement (CuKα: 1.5418 Å), and β is represented by the following formula (2).

$$\beta=b-B \quad (2)$$

In the above formula, b is a half band width of the peak, and B is a correction factor for the apparatus (B=0.114).

From the results of the calculation, crystal particle diameter $D_{XRD}$ of the coated copper particles was found to be 48.9 nm. Average primary particle diameter $D_{SEM}$ calculated from the results of the SEM examination was 85.8 nm, and therefore a $D_{XRD}/D_{SEM}$ ratio calculated is 0.57, and it is found that the ratio of the crystal particle diameter to the average primary particle diameter is relatively large.

Figure 2:
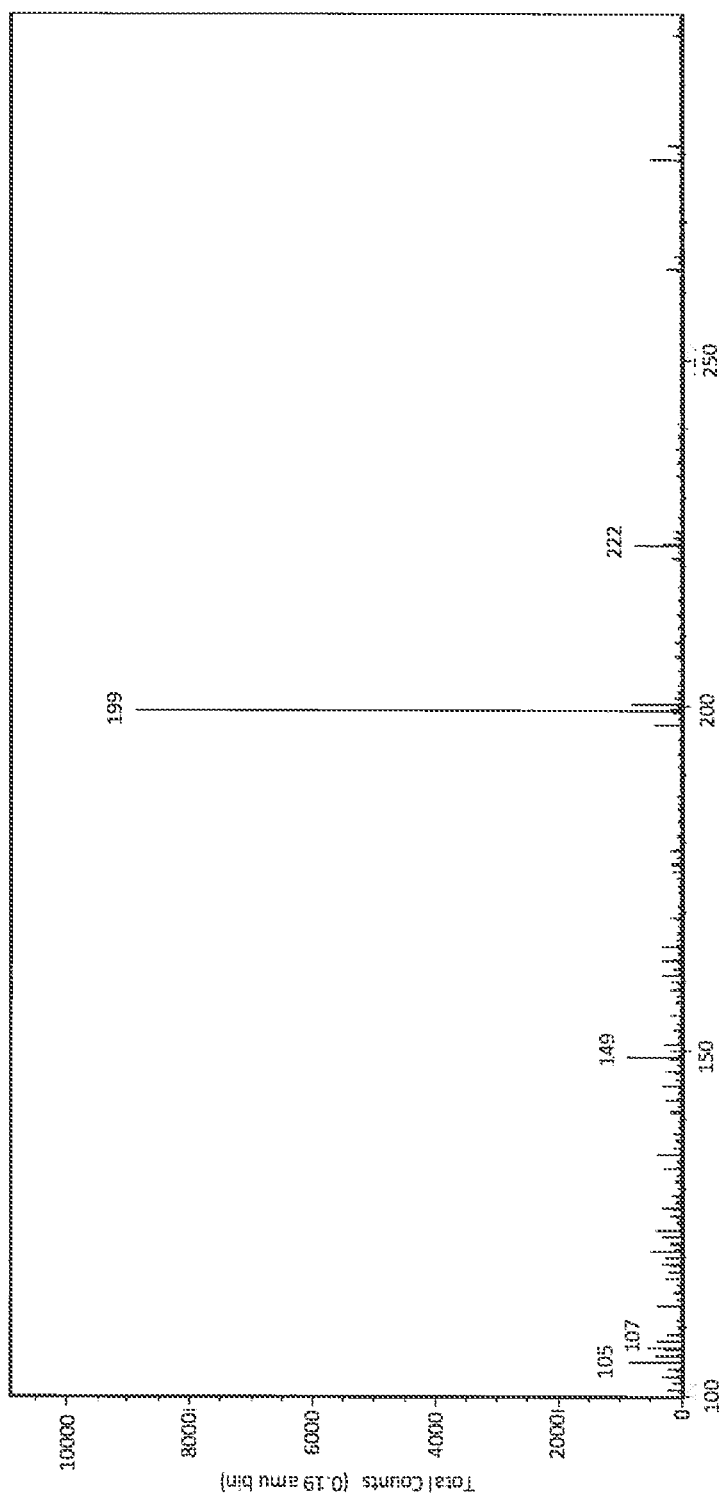
FIG. 2A Results of a Tof-SIMS analysis made with respect to the coated copper particles prepared in Example 1, showing Negative analysis results.
FIG. 2B Results of a Tof-SIMS analysis made with respect to the coated copper particles prepared in Example 1, showing partially enlarged Negative analysis results.
Figure 2:
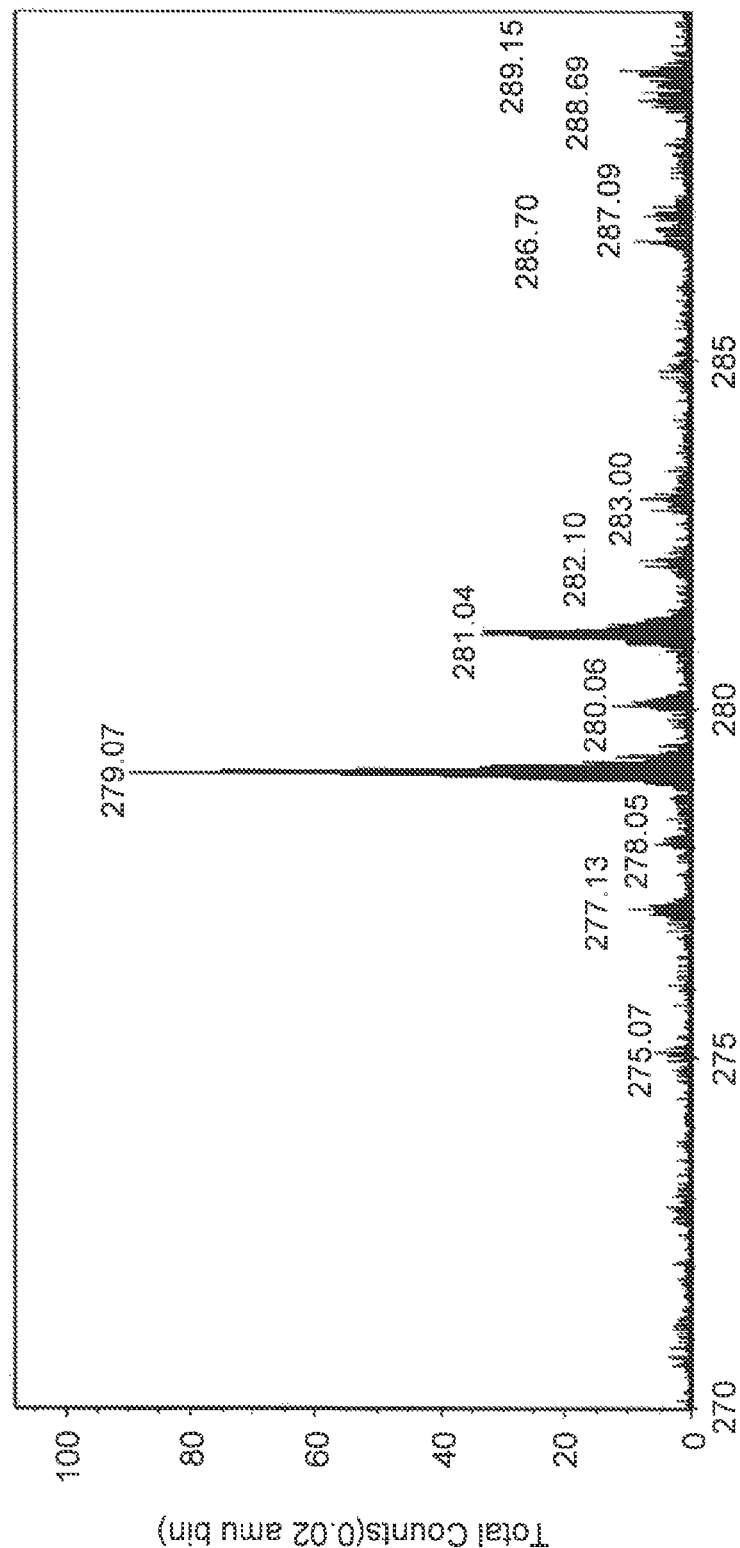

For examining the surface composition of the coated copper particles, a Tof-SIMS surface analysis was conducted. As seen from the results of the Tof-SIMS surface analysis, free lauric acid almost in agreement with a stoichiometrically expected amount was detected (shown in FIG. 2A), and, although in a slight amount, lauric acid bonded to hydroxides of $^{63}Cu$ and $^{65}Cu$ was also detected (shown in FIG. 2B). From the fact that lauric acid bonded to $^{63}Cu$ and $^{65}Cu$ was not detected, it has been found that almost all the material present on the surface of the coated copper particles is lauric acid coating the surface through physical adsorption.

Figure 3:
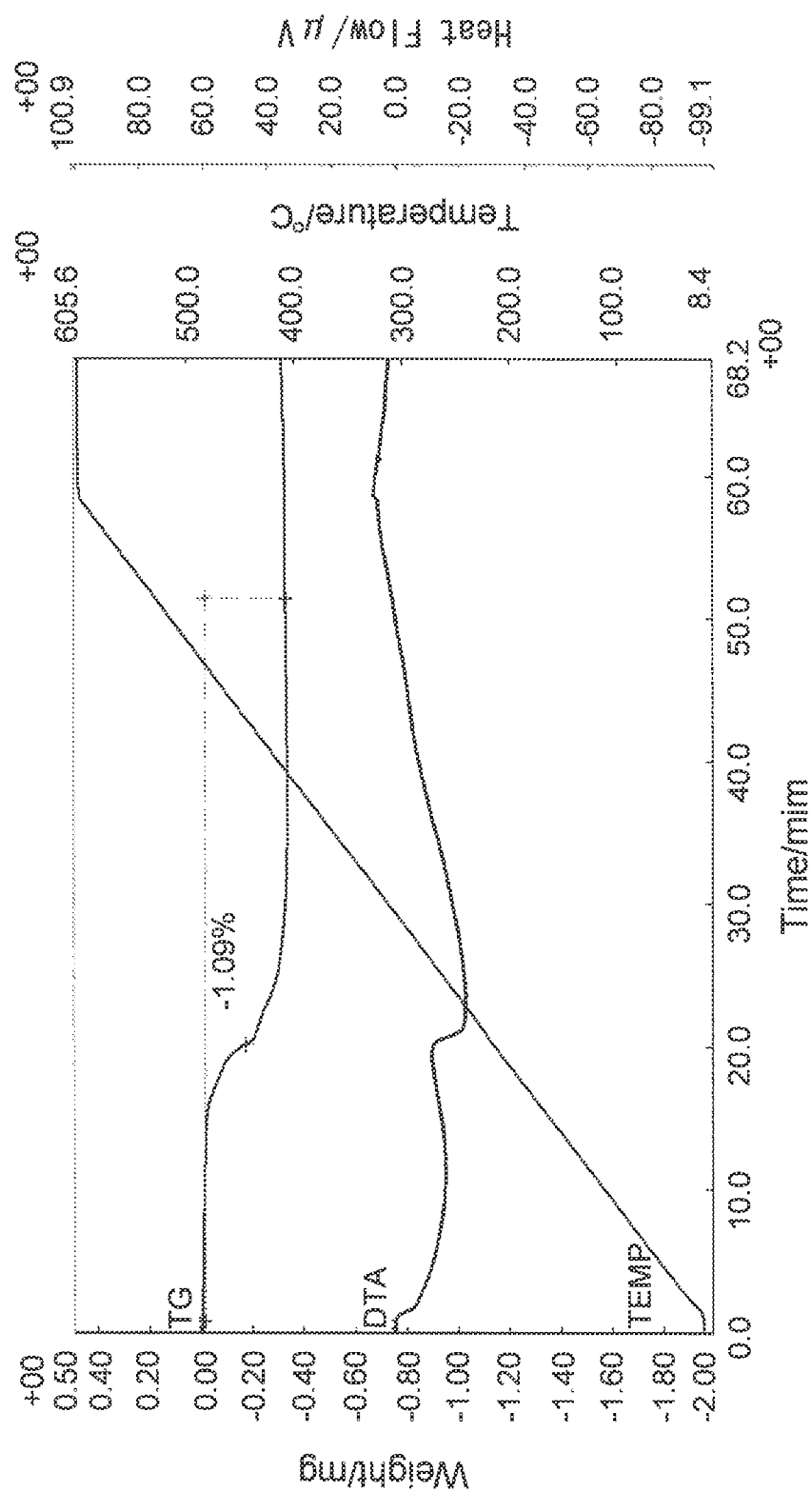
FIG. 3 TG-DTA analysis data of the coated copper particles prepared in Example 1.

For determining the amount of the organic component coating the surface of the coated copper particles, a TG-DTA analysis was conducted (FIG. 3). From the results of the TG-DTA analysis, it is found that a heating loss is 1.09% by mass, and that almost all the organic component is eliminated at around the boiling point of lauric acid. This result also suggests that lauric acid physically adsorbs onto the copper particles, and it is expected that the coated copper particles can exhibit a low-temperature sintering property.

A coating density of the aliphatic carboxylic acid coating the surface of the copper particles was determined by the method described below.

According to the results of the Tof-SIMS analysis, when it is assumed that the whole of the heating loss component is lauric acid, the number of lauric acid molecules contained in the coated copper particles is represented by the formula (3).

$$\text{[The number of lauric acid molecules]}=M_{acid}/(M_W/N_A) \quad (3)$$

In the above formula, $M_{acid}$ is a value of mass (g) of the heating loss measured, $M_W$ is the molecular weight of lauric acid (g/mol), and $N_A$ is an Avogadro's constant ($6.02\times10^{23}$/mol).

When it is assumed that the primary particle diameter determined by an examination under a SEM is substantially derived from reduced copper and the shape of the particle is a sphere, the number of the copper particles per 1 g is represented by the formula (4).

$$\text{[The number of copper particles per 1 g]}=M_{Cu}/[(4\pi r^3/3)\times d \times 10^{-21}] \quad (4)$$

In the above formula, $M_{Cu}$ is a value of mass (g) calculated from the value of a heating loss measured, r is a radius (nm) for the primary particle diameter calculated from an examination under a SEM, and d is a density (the density of copper was substituted for d; d=8.94). A particle surface area of the copper particles per 1 g is represented by the formula (5) using the formula (4).

$$\text{[Copper particle surface area (nm}^2\text{) per 1 g]}=\text{[The number of copper particles per 1 g]}\times 4\pi r^2 \quad (5)$$

A coating density of lauric acid (molecules/nm$^2$) in the copper particles is represented by the formula (6) using the formulae (3) and (5).

$$\text{[Coating density]}=\text{[The number of lauric acid molecules]}/\text{[Copper particle surface area per 1 g]} \quad (6)$$

From the results of the calculation, the coating density of lauric acid in the coated copper particles was found to be 4.23 molecules/nm$^2$.

According to "Chemistry and Education, Vol. 40, No. 2 (1992), Determining cross-sectional area of stearic acid molecule, —Experimental values and Calculated values—", the minimum area is calculated from the Van der waals radius of a stearic acid molecule, and the theoretical value of saturated coating area determined from the above calculated value is about 5.00 molecules/nm$^2$. From the theoretical value, it is presumed that the coated copper particle according to the present embodiment has lauric acid localized on the surface of the particle at a relatively high density. The reason that the coated copper particles have excellent oxidation resistance even though coating with lauric acid is made through physical adsorption weaker than chemical adsorption is considered to reside in the effect of coating with lauric acid at a high density.

Next, taking Example 1 as an example, the reaction mechanism in the present invention was presumed by making an analysis for components of the gas and distillate discharged during the reaction.

<Analysis for Gas Components>
Method: Gas chromatography
Measurement apparatus: GL Science GL320
Detector: Thermal conductivity detector (TCD)
Column: Stainless steel column 0 mm×2 m
Column packing material (hydrogen): Molecular Sieve 5A
Column packing material (carbon dioxide): Active Carbon
Carrier gas (hydrogen): $N_2$, 20 mL/min
Carrier gas (carbon dioxide): He, 50 mL/min
Temperature for measurement: 43 to 50° C.
Current value: 70 to 120 mA <Analysis for Distillate Components>
Method: Infrared spectroscopy
Measurement apparatus: PerkinElmer Spectrum One

TABLE 1

| Sample No. | Sampling time (min) | Discharge rate (L/min) | $H_2$ (%) | CO (%) | $CO_2$ (%) | Remarks |
|---|---|---|---|---|---|---|
| (1) | 17 | 0.22 | <0.1 | <0.1 | 0.5 | Remainder is $N_2$ |
| (2) | 19 | 1.03 | 0.5 | <0.1 | 52.3 | Remainder is $N_2$ |

TABLE 1-continued

| Sample No. | Sampling time (min) | Discharge rate (L/min) | $H_2$ (%) | CO (%) | $CO_2$ (%) | Remarks |
|---|---|---|---|---|---|---|
| (3) | 26 | 2.45 | 0.5 | <0.1 | 88.5 | Remainder is $N_2$ |
| (4) | 28 | 2.28 | 12.0 | <0.1 | 81.0 | |
| (5) | 31 | 2.09 | 45.1 | <0.1 | 50.0 | |
| (6) | 44 | 1.45 | 52.9 | <0.1 | 45.9 | |
| (7) | 68 | 0.88 | 36.5 | <0.1 | 57.9 | |
| (8) | 76 | 0.83 | 34.4 | <0.1 | 60.1 | |
| (9) | 99 | 0.42 | 33.2 | <0.1 | 64.6 | |
| (10) | 119 | 0.27 | 29.3 | <0.1 | 62.6 | |

Figure 4:
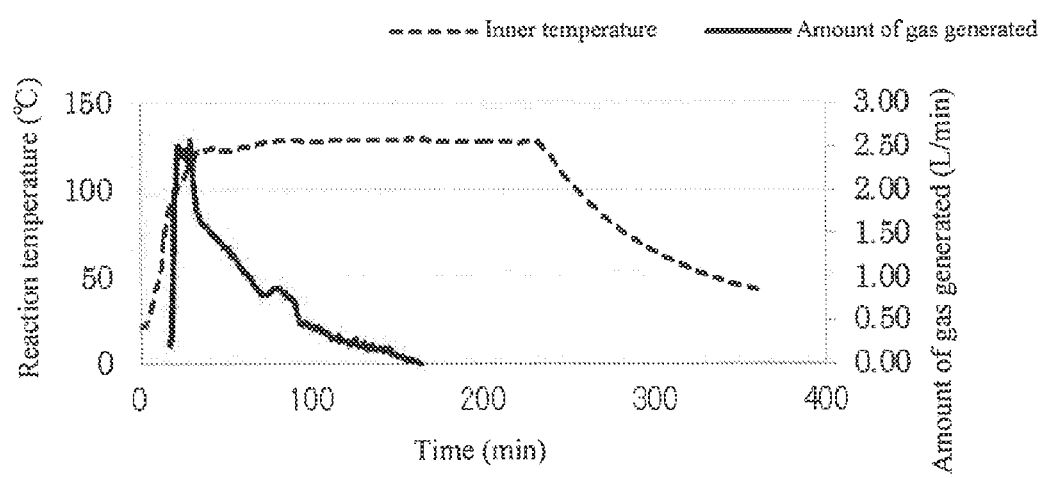
FIG. 4 Data obtained by plotting the reaction temperature and the total amount of the gas generated during the synthesis in Example 1.

At the initial stage of the reaction, from the fact that the discharged gas component is carbon dioxide gas and the reaction temperature is about 120° C. (FIG. 4), it is considered that a reaction of reaction formula 1 shown below occurs, and then a reaction proceeds according to the reaction mechanism of reaction formula 2. That is, one molecule of lauric acid first causes an equilibrium exchange reaction with one molecule of formic acid in a copper formate-amino alcohol complex.

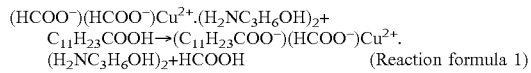
(Reaction formula 1)

Generally, it is considered that copper formate, which exhibits thermal decomposition properties at about 210 to 250° C., forms a complex compound together with lauric acid and 3-amino-1-propanol to lower the thermal decomposition temperature. While the complex compound undergoes a thermal decomposition reaction at about 100 to 130° C. to release carbon dioxide gas, a reduction reaction of bivalent copper ions proceeds (reaction formula 2). It is considered that lauric acid physically adsorbs on reduced copper formed after decomposition of the complex compound.

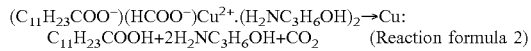
(Reaction formula 2)

It is considered that lauric acid adsorbing on the reduced copper undergoes a reversible equilibrium (reaction formula 3), and a lauric acid equilibrium exchange reaction with a copper formate-alkanol amine complex is caused again in the vicinity of the reduced copper according to reaction formula 1, so that reduced metal nuclei are successively generated.

(Reaction formula 3)

At the last stage of the reaction, the discharged gas components are hydrogen gas and carbon dioxide gas, and, from the ratio of the gas components, the reaction mechanism shown below is considered to proceed.

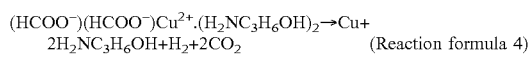
(Reaction formula 4)

It is considered that, as lauric acid is consumed as a coating material in the particle growth mechanism for the reduced copper rather than in the equilibrium exchange reaction for forming a complex compound with copper formate, not only the reaction of reaction formula 1 but also the reaction of reaction formula 4 proceed at the same time.

Figure 5:
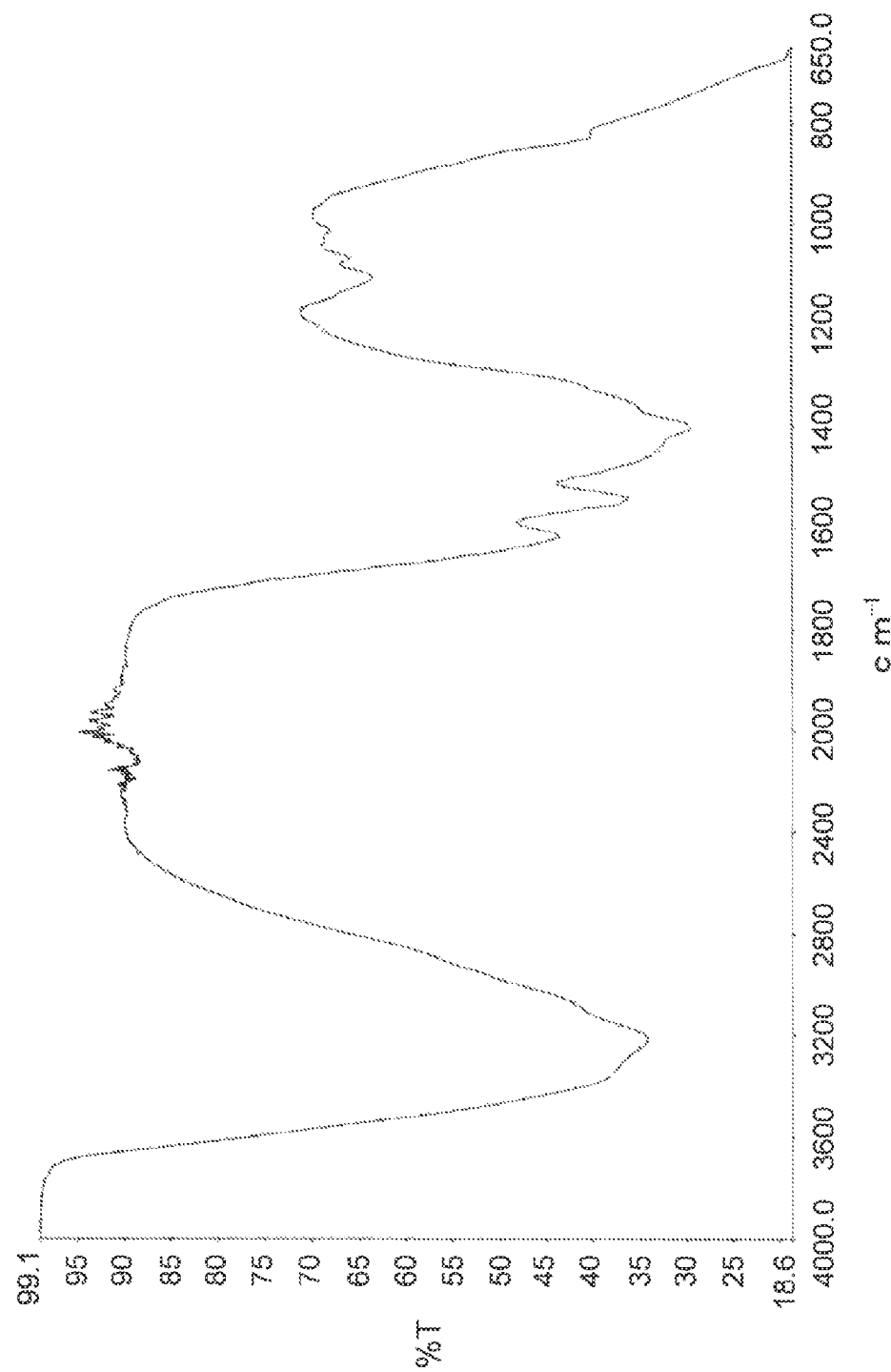
FIG. 5 FT-IR analysis data of the distillate distilled during the synthesis in Example 1.

The distillate distilled during the reaction was water molecules (FIG. 5).

Japanese Unexamined Patent Publication No. 2011-032558 discloses that the remaining water molecules cause the copper formate-amino alcohol complex to suffer hydrolysis to form copper oxide. When this is applied to the present invention, copper oxide is formed according to the reaction shown below.

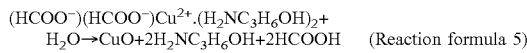
(Reaction formula 5)

When water molecules are present in the reaction system, the mechanism of reaction formula 5 is considered to proceed to form copper oxide. However, the presence of copper oxide was not confirmed in the coated copper particles obtained in Example 1 (FIG. 1A). From these results, it is presumed that a reaction mechanism for reducing copper oxide separate from the primary reaction is present. As a reduction reaction mechanism for copper oxide, a reduction reaction by formic acid, such as reaction formula 6, is considered.

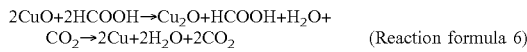
(Reaction formula 6)

Alternatively, it is considered that copper oxide and formic acid regenerate copper formate as shown in reaction formula 7, so that a reduction reaction proceeds.

(Reaction formula 7)

The regenerated copper formate undergoes a reaction of reaction formula 1, and a reaction is caused according to reaction formula 2, so that a reduction reaction proceeds. It is considered that water molecules are formed due to the side reaction and discharged as a distillate. This side reaction is a reaction that can be caused when formic acid is present in the reaction system. Therefore, it is presumed that even when copper oxide is unexpectedly formed, the reduction reaction mechanism according to reaction formulae 6 and 7 enables a synthesis of coated copper particles having no oxide For checking whether the above-mentioned reduction reaction mechanism can be caused in the method according to the present embodiment, a reaction was conducted under conditions such that copper oxide is intentionally added to the reaction system. The results of the reaction are described below in Reference Example 2.

Reference Example 2

A 100 mL four-neck glass flask equipped with a stirrer, a thermometer, a reflux condenser, and a nitrogen introducing tube was set in an oil bath. 12.0 g (0.08 mol) of copper formate anhydride, 2.0 g of copper oxide (manufactured by Kanto Chemical Co., Inc.) (0.32 equivalent/copper formate anhydride), 2.0 g of lauric acid (manufactured by Kanto Chemical Co., Inc.; 1st grade reagent) (0.12 equivalent/copper formate anhydride), 4.4 g of tripropylene glycol monomethyl ether (manufactured by Tokyo Chemical Industry Co., Ltd.) (0.27 equivalent/copper formate anhydride), and 16.6 g of SWACLEAN 150 (manufactured by Godo Co., Ltd.) (1.67 equivalent/copper formate anhydride) were placed in the flask, and mixed with one another while stirring at 200 rpm. The resultant mixture was heated in a nitrogen gas atmosphere while stirring at 200 rpm until the temperature of the mixture became 50° C. To the mixture was added dropwise slowly 21.0 g of 3-amino-1-propanol (manufactured by Tokyo Chemical Industry Co., Ltd.) (3.50 equivalents/copper formate anhydride). After completion of the addition, the resultant mixture was heated while stirring at 340 rpm until the temperature of the mixture became about 120° C. As the temperature increased, the reaction mixture started changing in color from deep blue to brown and bubbles of carbon dioxide gas were generated. A time when the generation of bubbles of carbon dioxide gas was ended was determined as a reaction end point, and the temperature control using an oil bath was stopped, so that the reaction mixture was cooled to room temperature. After cooling to room temperature, 20.0 g of methanol (manufactured by Kanto Chemical Co., Inc.) was added to and mixed with the reaction mixture. The resultant mixture was allowed to stand for 30 minutes or longer, and the resultant supernatant was removed by decantation to obtain a precipitate. To the precipitate were added 20.0 g of methanol (manufactured by Kanto Chemical Co., Inc.) and 10.0 g of acetone (manufactured by Kanto Chemical Co., Inc.), followed by mixing with one another. The resultant mixture was allowed to stand for 30 minutes or longer, and the resultant supernatant was removed by decantation to obtain a precipitate. This operation was repeated once. The resultant precipitate was transferred to a 100 mL eggplant-shaped flask while washing the precipitate using 20.0 g of methanol (manufactured by Kanto Chemical Co., Inc.). After allowed to stand for 30 minutes or longer, the resultant supernatant was removed by decantation, and the obtained precipitate was set to a rotary evaporator and subjected to vacuum drying at 40° C. under 1 kPa or less. After completion of the vacuum drying, the precipitate was cooled to room temperature, and the reduced pressure was increased by introducing nitrogen gas, obtaining 6.5 g of a brown copper powder.

Figure 6:
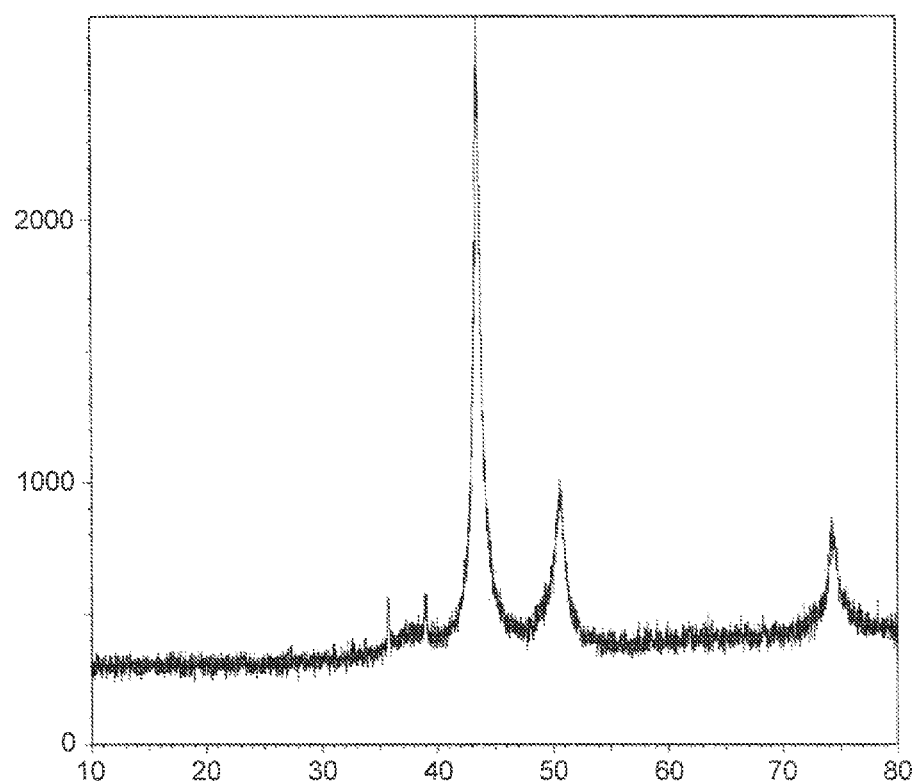
FIG. 6 XRD data of the coated copper particles prepared in Reference Example 2.

With respect to the coated copper particles obtained in Reference Example 2, a powder X-ray analysis was conducted (FIG. 6). It is found that almost all the copper oxide added has been reduced to be converted to reduced copper. The result suggests that even when copper oxide is formed in the reaction system, the copper oxide is converted to reduced copper by a reduction reaction due to formic acid.

According to the example of reaction mechanism described in Japanese Unexamined Patent Publication No. 2011-032558, like the present embodiment, a copper formate-amino alcohol complex containing an aliphatic carboxylic acid is formed.

$$(R_1COO^-)(HCOO^-)Cu^{2+}:[(C_2H_5)_2NC_2H_4OH]_2 \rightarrow Cu:[(C_2H_5)_2NC_2H_4OH]_2 + R_1COOH + CO_2 \quad \text{(Reaction formula 8)}$$

Further, Japanese Unexamined Patent Publication No. 2011-032558 has descriptions that the amino alcohol is limited to a bidentate-coordinating amino alcohol and hence the copper formate complex having such an amino alcohol has a low thermal decomposition temperature, and that formic acid eliminated due to an exchange reaction of the aliphatic carboxylic acid and the copper formate-amino alcohol complex is discharged out of the system. Furthermore, the reaction conditions at low temperatures are employed, and therefore it is considered that a reduction reaction caused by formic acid present in the reaction system does not proceed.

Further, according to the example of reaction mechanism described in Japanese Unexamined Patent Publication No. 2008-013466, all the formic acid present in the reaction system is decomposed into hydrogen and carbon dioxide gas by a thermal decomposition reaction of the complex compound.

$$(HCOO^-)(HCOO^-)Cu^{2+}.(NH_2R_2)_2 \rightarrow Cu + 2NH_2R_2 + H_2 + 2CO_2 \quad \text{(Reaction formula 9)}$$

In contrast, the reaction mechanism in the present embodiment has both the formation of reduced copper due to a thermal decomposition reaction of the copper formate complex and the reaction mechanism in which the by-produced copper oxide is reduced according to reaction formulae 6 and 7, and therefore the coated copper particles synthesized by the method according to the present embodiment are unlikely to be oxidized. The method according to the present embodiment does not need strict production control in respect of water and oxygen which are mentioned as the cause of oxidation of metal copper, and thus is a method suitable for more easily synthesizing coated copper particles.

Next, with respect to the coated copper particles obtained in Examples 1 to 4 and Comparative Examples 1 to 5, a calculation of an SP value for the raw materials, a TG-DTA measurement, a powder X-ray analysis (XRD), and a SEM examination were performed. The methods for the measurement are as described below. The results are shown in Table 2.

TABLE 2

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Amino alcohol SP value | 13.45 | 12.74 | 12.33 | 12.74 | 8.48 | 9.98 | 10.78 | 12.33 | 13.45 |
| Solvent SP value | 8.21 | 8.21 | 7.53 | 7.53 | 8.21 | 8.21 | 8.21 | 8.21 | 9.77 |
| ΔSP value | 5.24 | 4.53 | 4.80 | 5.21 | 0.27 | 1.77 | 2.57 | 4.12 | 3.68 |
| Organic component amount (wt %) | 1.80 | 8.68 | 7.03 | 3.71 | 2.69 | 0.73 | 11.29 | 8.90 | 0.31 |
| XRD crystal particle diameter (nm) | 48.9 | 23.8 | 15.6 | 34.1 | 43.5 | 147.7 | 79.0 | 8.8 | 166.0 |
| SEM primary particle diameter (nm) | 85.8 | 51.2 | 58.8 | 50.5 | 137.7 | 626.2 | 2678.6 | 1125.5 | 813.9 |
| Crystallinity | 0.57 | 0.46 | 0.26 | 0.68 | 0.32 | 0.24 | 0.03 | 0.01 | 0.20 |
| Form of particles | Nanoparticles | Nanoparticles | Nanoparticles | Nanoparticles | Aggregate form | Aggregate form | Aggregate from | Aggregate form | Aggregate form |

As can be seen from the results shown in Table 2, when a difference between the SP value of the amino alcohol constituting the copper formate-amino alcohol complex and the SP value of the reaction solvent or the mixed solvent of a prime solvent and a co-solvent, i.e., a ΔSP value is as large as 4.2 or more, coated copper particles which are separate from one another can be produced. However, when a ΔSP value is 4.2 or less, the produced coated copper particles are not separate from one a method for producing coated copper particles.

Further, when the proportion of the size of crystal particle to that of primary particle is defined as crystallinity, the crystallinity is 0.25 or more, and is about 0.50 in most cases, which indicates that a single large crystal particle constitutes the coated copper particle.

With respect to the coated copper particles obtained in Examples 5 to 8 and Comparative Examples 6 and 7, a powder X-ray analysis and a SEM examination were performed. The results are shown in Table 3.

TABLE 3

|  | Example 1 | Example 5 | Example 6 | Example 7 | Example 8 | Example 9 | Comparative Example 6 | Comparative Example 7 |
|---|---|---|---|---|---|---|---|---|
| Oleic acid | — | 68.1 | — | — | — | — | — | — |
| Lauric acid | 68.1 | — | 16.0 | 144.0 | 68.1 | — | — | — |
| Octanoic acid | — | — | — | — | — | 45.4 | — | — |
| XRD crystal particle diameter (nm) | 48.9 | 33.7 | 39.0 | 48.8 | 45.4 | 45.9 | 56.0 | 76.0 |
| SEM primary particle diameter (nm) | 85.8 | 70.2 | 75.8 | 92.0 | 89.9 | 104.7 | 167.7 | 211.4 |
| Standard deviation | 13.2 | 11.0 | 17.4 | 11.1 | 17.4 | 41.5 | 59.9 | 60.4 |
| Crystallinity | 0.57 | 0.48 | 0.51 | 0.53 | 0.51 | 0.44 | 0.33 | 0.36 |
| Variation | 0.15 | 0.16 | 0.23 | 0.12 | 0.19 | 0.40 | 0.36 | 0.29 |

When the temperature increase rate is constant during the reaction, the reduction reaction rate is the same, and hence the amount of the metal nuclei generated is the same. From this, it is apparent that the particle diameter and particle size distribution vary depending on the factors controlling the size and stability of the micro-reaction field which is like a water-in-oil emulsion. When it is likely that the micro-reaction field is stabilized, the particle diameter and the variation tend to be smaller, and this tendency is remarkable as the carbon chain of the aliphatic carboxylic acid becomes longer (a comparison between Examples 1, 5, and 9). Further, when the molar number of the aliphatic carboxylic acid relative to copper atoms is increased, the reaction field tends to be stabilized, but, when the viscosity of the reaction system is increased, the particle diameter is increased even though the variation is small (a comparison between Examples 1, 6, and 7).

It has been confirmed that even when the ratio of the prime solvent and the co-solvent in the reaction solvent is changed so that the average SP value varies from 8.21 to 8.90, no large change is caused in the properties of the obtained coated copper particles as long as the ΔSP which is a difference in SP value between the amino alcohol and the reaction solvent is surely the value as defined in the present invention (a comparison between Examples 1 and 8).

In this connection, in accordance with the working Example of Japanese Unexamined Patent Publication No. 2013-047365, which is similar to the coated copper particle of the present embodiment in the point that the coating material is an aliphatic carboxylic acid, the production of coated copper particles was attempted in Comparative Examples 6 and 7. These methods are a method for producing coated copper particles, in which a reservoir which is an insoluble solid is used as a source of supplying copper atoms. Copper(I) oxide having a particle diameter as small as 2 to 4μ was used as a raw material, but the unreacted material remained after a predetermined reaction time. When the reaction time was increased twice, the copper oxide was stoichiometrically converted to reduced copper, but the average particle diameter of the resultant particles was increased. Further, the variation of the particle size distribution of the resultant particles was as large as 0.38 or 0.29.

Test Example 1

Evaluation of an Oxidation Resistance

Figure 1B:
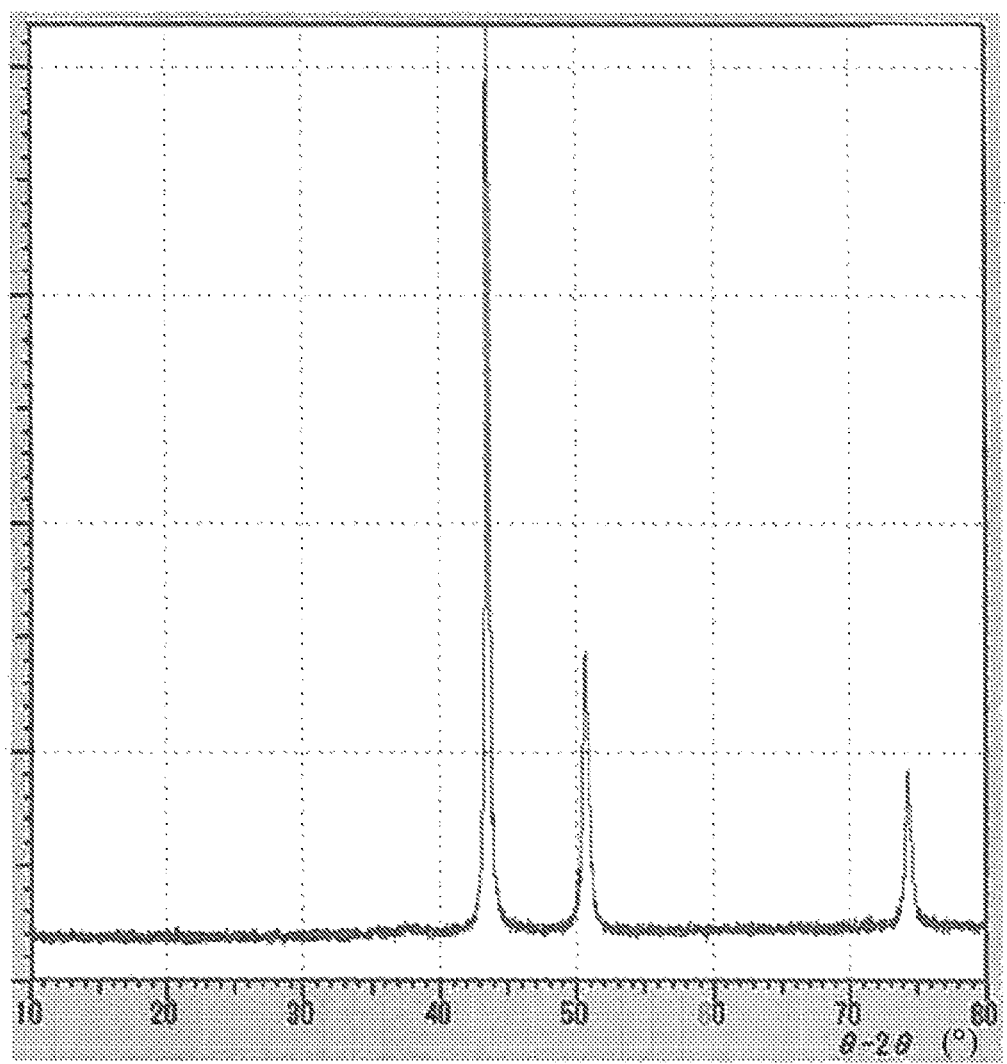
FIG. 1B XRD data of the coated copper particles prepared in Example 1, which is measured after being stored in the state of a powder in air at 25° C. for 4 months.

With respect to the coated copper particles produced under the conditions in Example 1, a powder X-ray analysis was conducted for those immediately after produced and those after stored at 25° C. for 4 months to check whether oxidation proceeded or not (FIGS. 1A and 1B). Even after 4 months, no oxide component was detected, and the result has confirmed that the coated copper particles produced by the method according to the present embodiment have excellent oxidation resistance.

Test Example 2

Properties of a Calcined Film Formed from a Coated Copper Particle Paste

The coated copper particles produced under the conditions in Example 1 were dispersed in a solvent to prepare a copper paste composition, and the paste composition was calcined in a nitrogen gas atmosphere at 300° C. or 350° C. for one hour to form a copper film (copper paste sintered layer), and an electric resistance of the formed film was measured. The coated copper particles and a solvent having the composition shown below were dispersed and kneaded using a mortar so as to form a paste, preparing a copper paste composition having a metal content of 33% by volume.

Copper Paste Composition A

| | |
|---|---|
| Coated copper particles in Example 1 | 10 Parts by mass |
| KYOWANOL M (manufactured by NH Neochem Co., Ltd.) | 2 Parts by mass |

The above-prepared copper paste was applied to a polyimide film having a thickness of 40 μm and having a 12 μm copper foil laminated on the back side so that the wet thickness of the applied paste became about 10 μm, and dried and calcined in a nitrogen gas atmosphere to prepare a sample for evaluation.

An average thickness of the film of calcined copper was measured by examining the cross-section of the film under a SEM. The thickness of the copper paste sintered layer was found to be 2.4 μm.

Figure 24A:
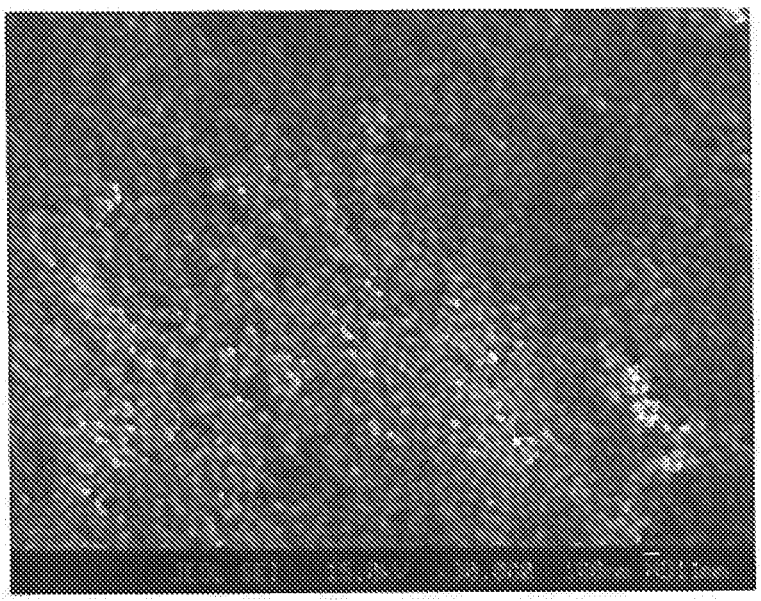
FIG. 24A A SEM examination image of the coated copper particles prepared in Example 1.
Figure 24B:
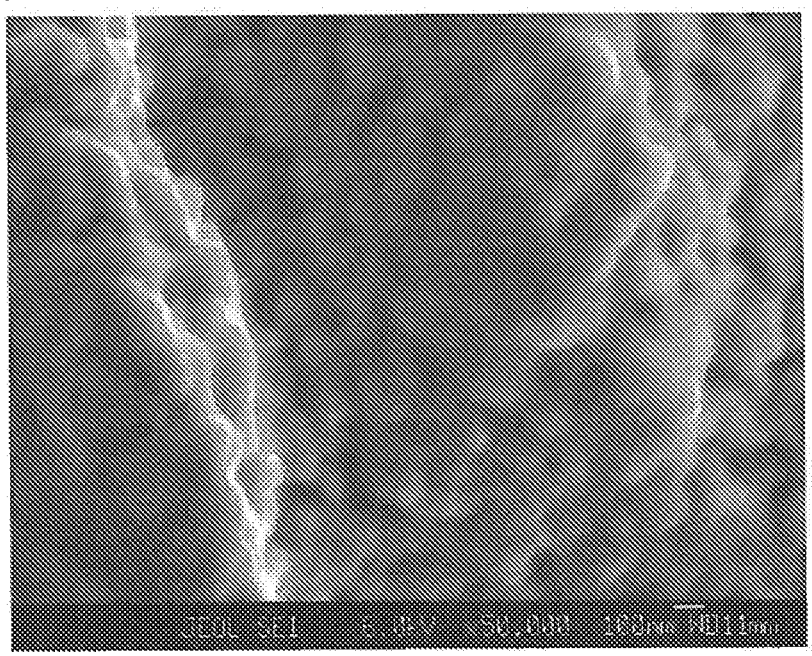
FIG. 24B A SEM examination image of a sintered film which is obtained by preparing a paste of the coated copper particles prepared in Example 1, i.e., copper paste A and calcining copper paste A in a nitrogen gas atmosphere at 350° C. for one hour.
Figure 25:
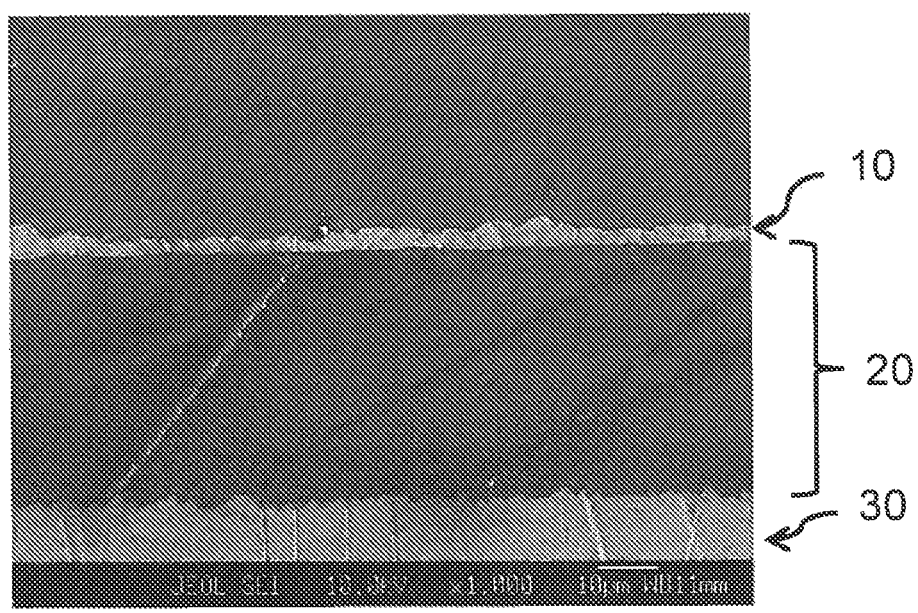
FIG. 25 A cross-sectional SEM image of a calcined film fixated from copper paste A.

SEM examination images of the prepared coated copper particles and calcined copper film are shown in FIGS. 24A and 24B, a SEM cross-section examination image of the sample for evaluation used in the measurement is shown in FIG. 25, and the results of the measurement are shown in Table 4.

In FIG. 25, copper paste sintered layer 10 which is a calcination product of the copper paste composition is formed on the surface of polyimide film layer 20 on the other side of copper foil layer 30, wherein polyimide film layer 20 has a thickness of 40 μm, and has copper foil layer 30 having a thickness of 12 μm on one side of the polyimide film.

Test Example 3

Using the coated copper particles produced in Comparative Example 7, copper paste composition B was prepared in the same manner as in Test Example 2, and calcined in a nitrogen gas atmosphere at 350° C. for one hour to form a copper film, and an electric resistance of the formed film was measured.

Copper Paste Composition B

| | |
|---|---|
| Coated copper particles in Comparative Example 7 | 10 Parts by mass |
| KYOWANOL M (manufactured by NH Neochem Co., Ltd.) | 2 Parts by mass |

Figure 26B:
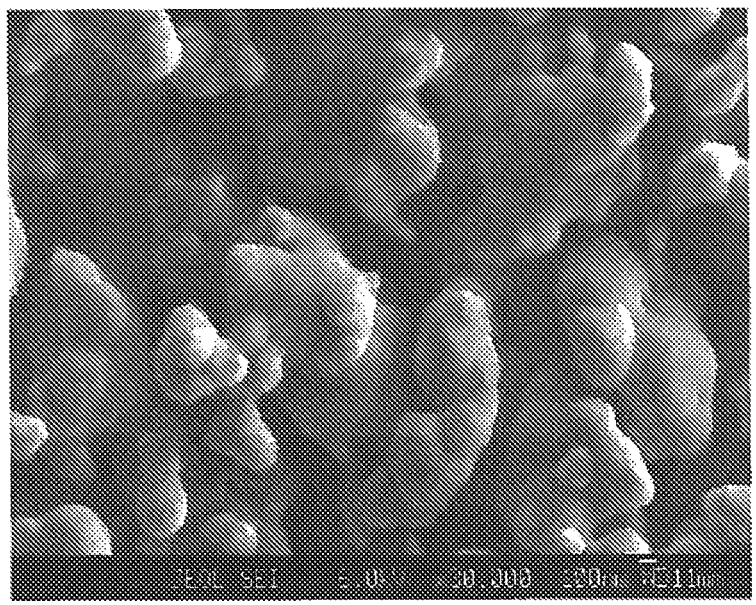
FIG. 26B A SEM examination image of a sintered film which is obtained by preparing a paste of the coated copper particles prepared in Comparative Example 7, i.e., copper paste B and calcining copper paste B in a nitrogen gas atmosphere at 350° C. for one hour.

SEM examination images of the prepared coated copper particles and calcined copper film are shown in FIGS. 26A and 26B, and the results of the measurement of electric resistance are shown in Table 4.

Test Example 4

Properties of a calcined film formed from a mixed paste of the coated copper particles and a copper powder The coated copper particles produced in Example 1 were added as a sintering agent to a commercially available copper powder to prepare a copper paste composition, and the paste composition was calcined in a nitrogen gas atmosphere at 300° C. or 350° C. for one hour to form a copper film, and an electric resistance of the formed film was measured. The materials having the composition shown below were dispersed and kneaded by means of a three-roll mill to prepare a copper paste composition having a metal content of 60% by volume.

Copper Paste Composition C

| | |
|---|---|
| Coated copper particles in Example 1 | 100 Parts by mass |
| Wet-process copper powder 2.0 μm (1200N, manufactured by Mitsui Mining & Smelting Co., Ltd.) | 100 Parts by mass |
| Wet-process copper powder 0.8 μm (1050Y, manufactured by Mitsui Mining & Smelting Co., Ltd.) | 25 Parts by mass |
| Polyacrylic acid dispersant | 0.5 Part by mass |
| KYOWANOL M (manufactured by NH Neochem Co., Ltd.) | 15 Parts by mass |

The above-prepared copper paste was applied to a polyimide film having a thickness of 40 μm and having a 12 μm copper foil laminated on the back side so that the wet thickness of the applied paste became about 10 μm, and dried and calcined in a nitrogen gas atmosphere to prepare a sample for evaluation.

An average thickness of the film of calcined copper was measured by examining the cross-section of the film under a SEM. The thickness of the copper paste sintered layer was found to be 4.2 μm.

Figure 27:
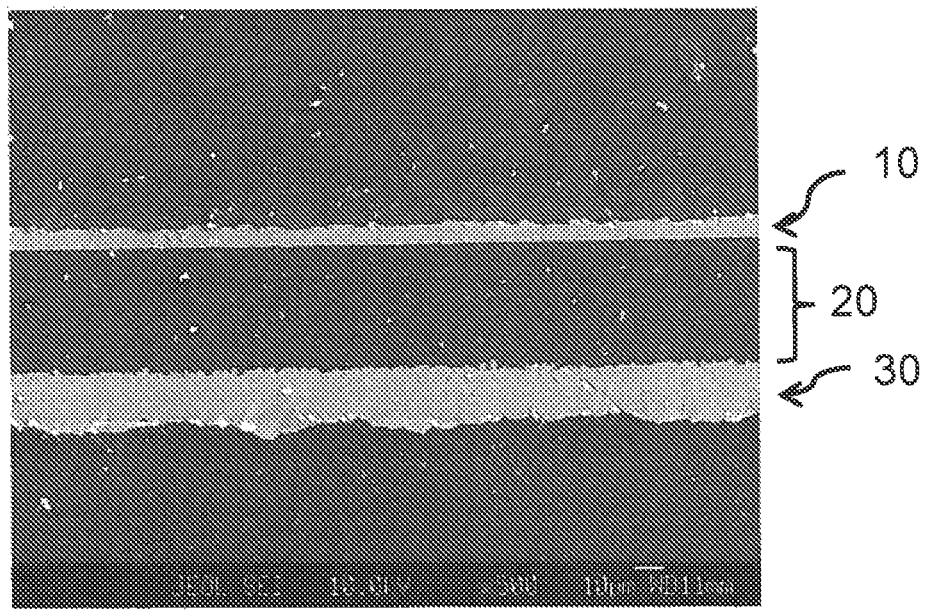
FIG. 27 A cross-sectional SEM image of a calcined film formed from copper paste C.

A SEM cross-section examination image of the sample for evaluation used in the measurement is shown in FIG. 27, and the results of the measurement are shown in Table 4.

In FIG. 27, copper paste sintered layer 10 which is a calcination product of the copper paste composition is formed on the surface of polyimide film layer 20 on the other side of copper foil layer 30, wherein polyimide film layer 20 has a thickness of 40 μm, and has copper foil layer 30 having a thickness of 12 μm on one side of the polyimide film.

TABLE 4

| | Calcination conditions (in nitrogen atmosphere) | | | |
|---|---|---|---|---|
| | Drying conditions | Pre-calcination conditions | Main calcination conditions | Volume resistivity (μΩ · cm) |
| Copper paste composition A | 120° C. × 15 min | 270° C. × 30 min | 300° C. × 1 hr | 6.0 |
| | 120° C. × 15 min | 270° C. × 30 min | 350° C. × 1 hr | 5.3 |
| Copper paste composition B | 120° C. × 15 min | 270° C. × 30 min | 350° C. × 1 hr | 22.3 |
| Copper paste composition C | 120° C. × 15 min | 270° C. × 30 min | 300° C. × 1 hr | 5.1 |
| | 120° C. × 15 min | 270° C. × 30 min | 350° C. × 1 hr | 4.4 |

A copper paste composition was prepared using the coated copper particles capable of being calcined in a nonreducing atmosphere, and a sintered copper film formed from the composition was evaluated with respect to the electric properties and the surface composition structure, and thus industrial technical usefulness of the film was confirmed.

The electric properties and the surface composition structure as measured by XPS were evaluated with respect to each of copper paste composition A using the coated copper particles produced in Example 1 (Test Example 2), copper paste composition C having a commercially available copper powder mixed into the coated copper particles produced in Example 1 (Test Example 4), and copper paste composition B for comparison using the coated copper particles prepared in Comparative Example 7 in accordance with Example 1 of Japanese Unexamined Patent Publication No. 2013-047365 (Test Example 3).

As a result, copper paste compositions A and C prepared using the coated copper particles in Example 1 exhibited conductivity performance as high as 4 to 6 µΩ·cm. Further, the results have confirmed that copper paste compositions A and C exhibit such high adhesion to an untreated polyimide surface that the composition is not peeled off the surface in a general bending test. Copper paste composition B, which uses the coated copper particles similarly coated with an aliphatic carboxylic acid, exhibited a volume resistivity value of 22 µΩ·cm which is higher than that of copper bulk by one digit or more.

With respect to the surface composition structure of the sintered copper films formed from copper paste compositions A and B, a compositional analysis by XPS was conducted, and observations were made on the mechanism in which a difference is caused in the electric properties between the surface compositions.

Figure 28A:
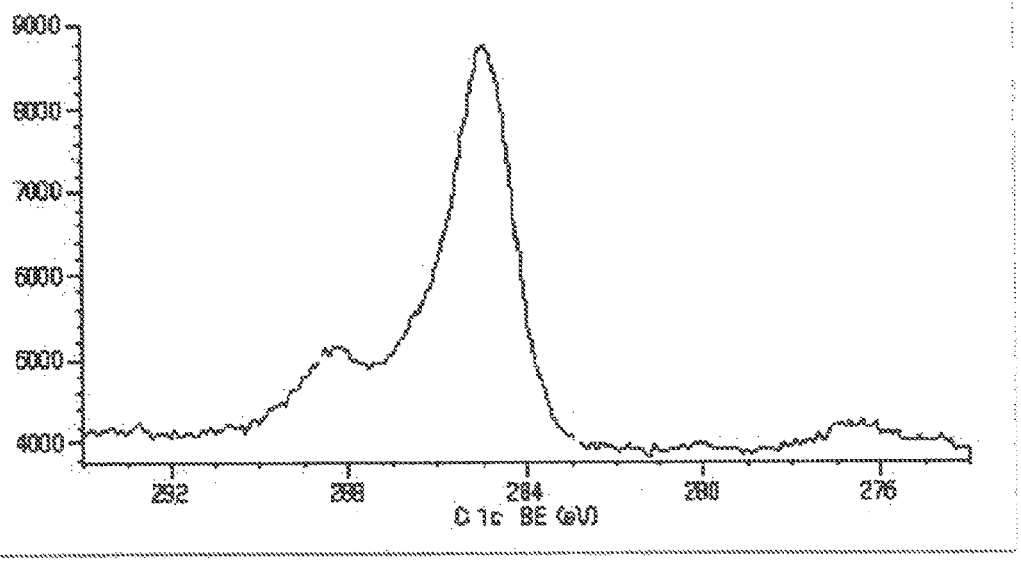
FIG. 28A Diagram showing data for carbon atoms in the XPS uppermost surface compositional analysis data in Test Example 2.
Figure 28B:
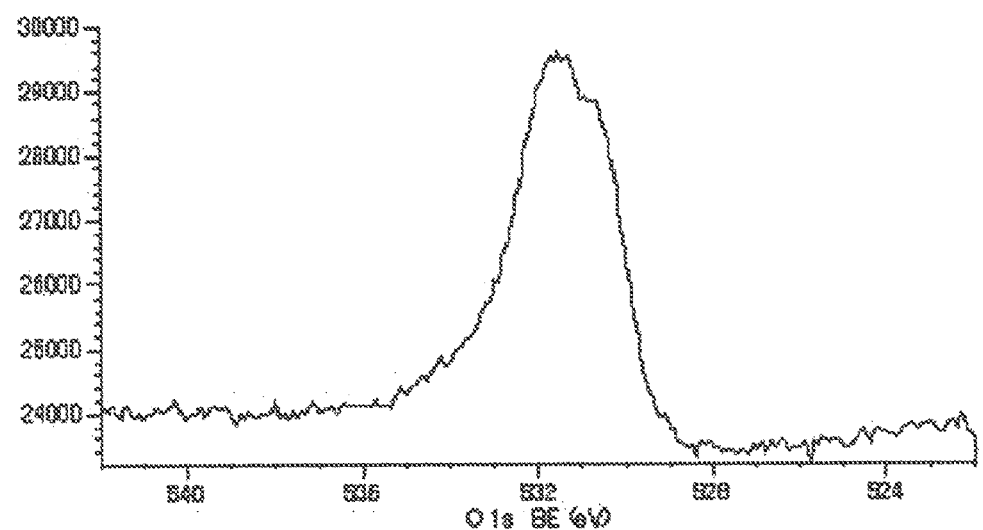
FIG. 28B Diagram showing data for oxygen atoms in the XPS uppermost surface compositional analysis data in Test Example 2.
Figure 28C:
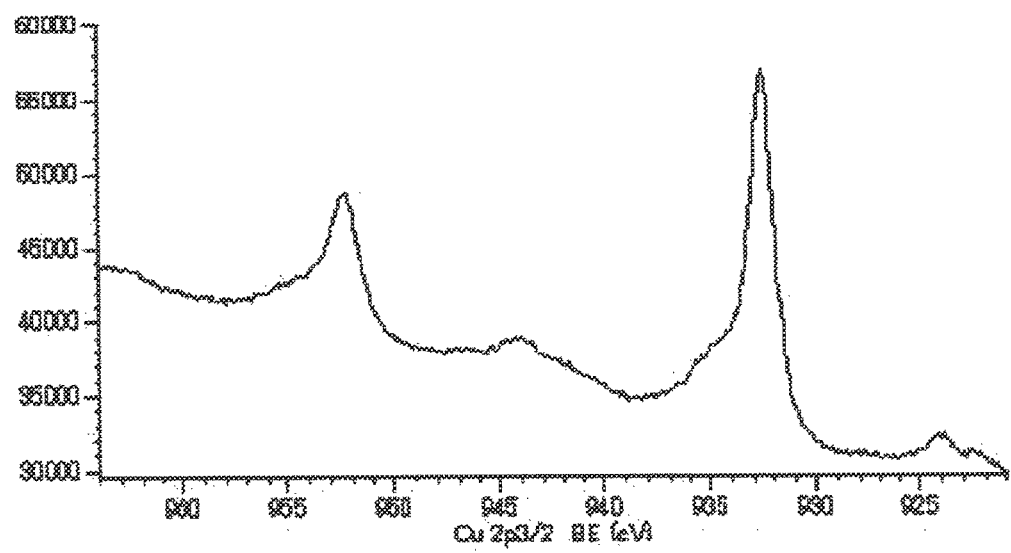
FIG. 28C Diagram showing data for copper atoms in the XPS uppermost surface compositional analysis data in Test Example 2.
Figure 29A:
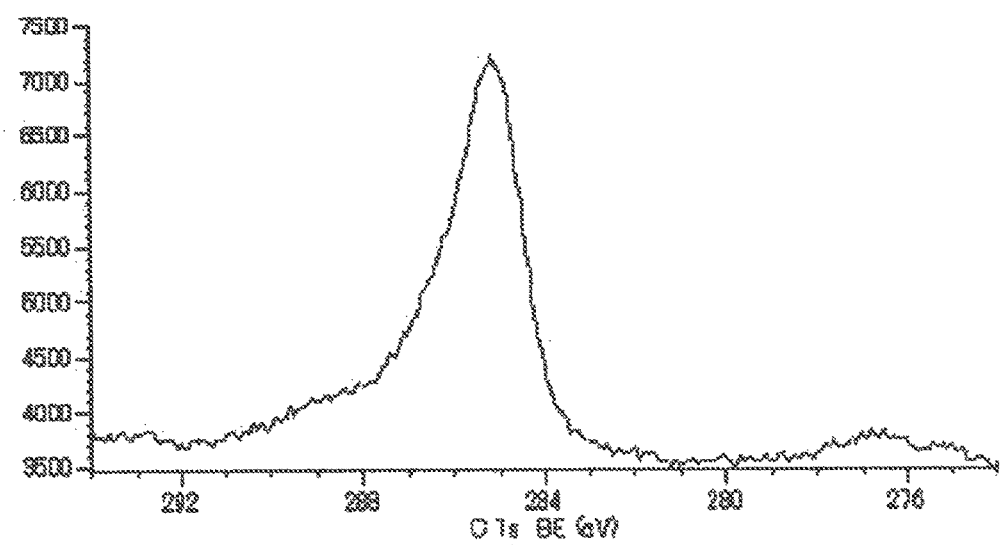
FIG. 29A Diagram showing data for carbon atoms in the XPS uppermost surface compositional analysis data in Test Example 3.
Figure 29B:
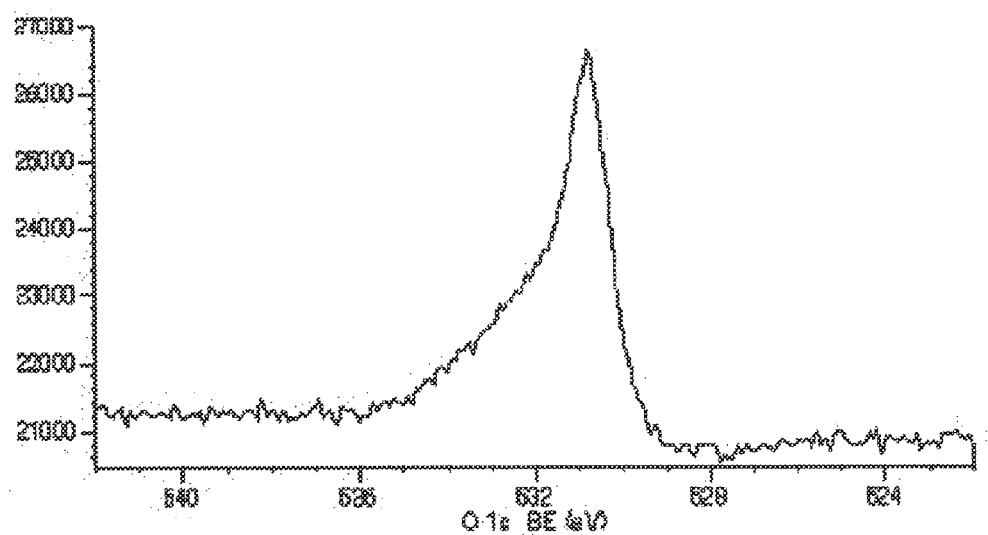
FIG. 29B Diagram showing data for oxygen atoms in the XPS uppermost surface compositional analysis data in Test Example 3.
Figure 29C:
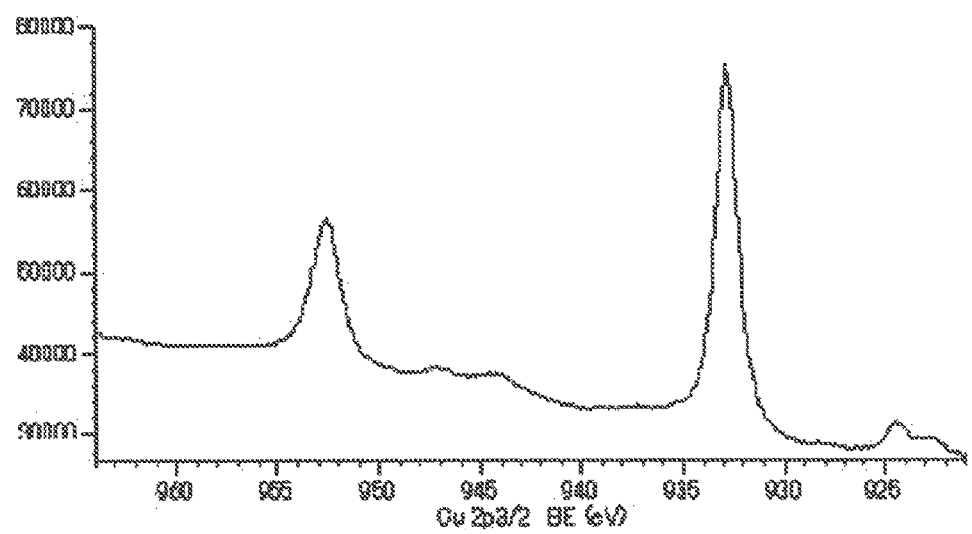
FIG. 29C Diagram showing data for copper atoms in the XPS uppermost surface compositional analysis data in Test Example 3.
Figure 30A:
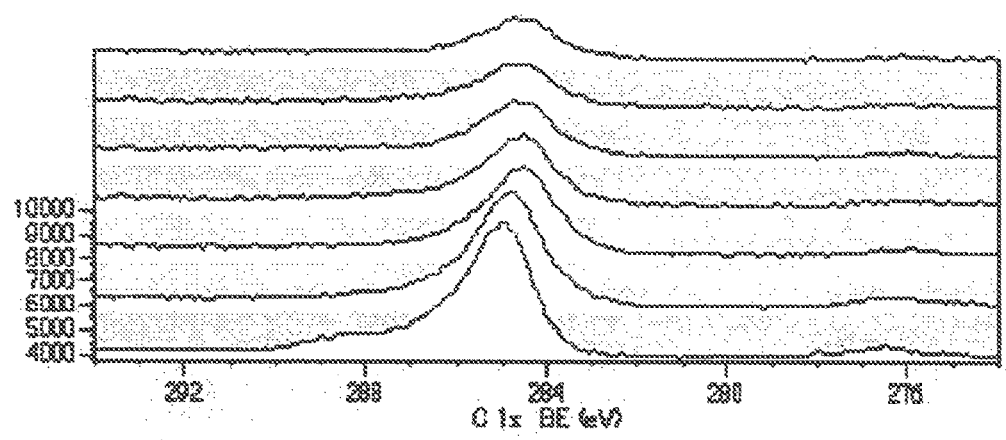
FIG. 30A Diagram showing the distribution of carbon atoms in the XPS-Depth Profile compositional analysis data in Test Example 2.
Figure 30B:
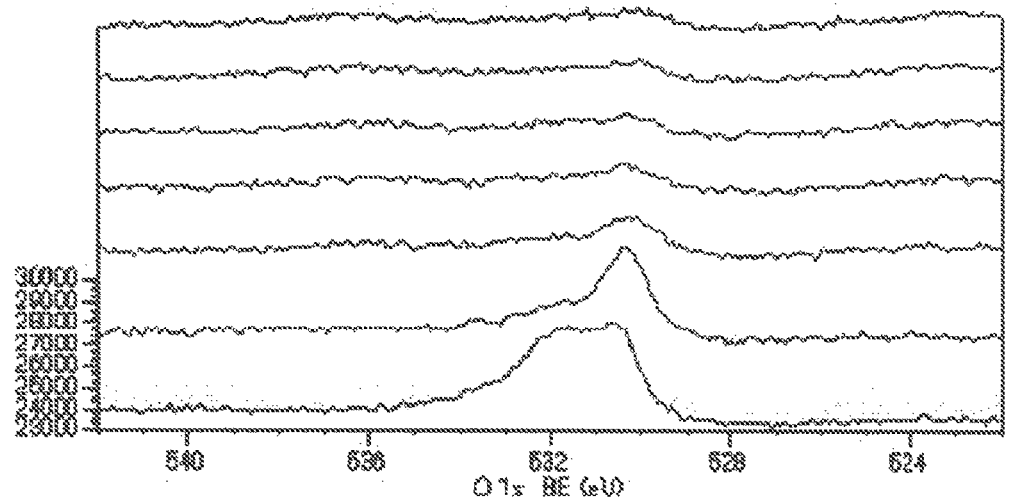
FIG. 30B Diagram showing the distribution of oxygen atoms in the XPS-Depth Profile compositional analysis data in Test Example 2.
Figure 30C:
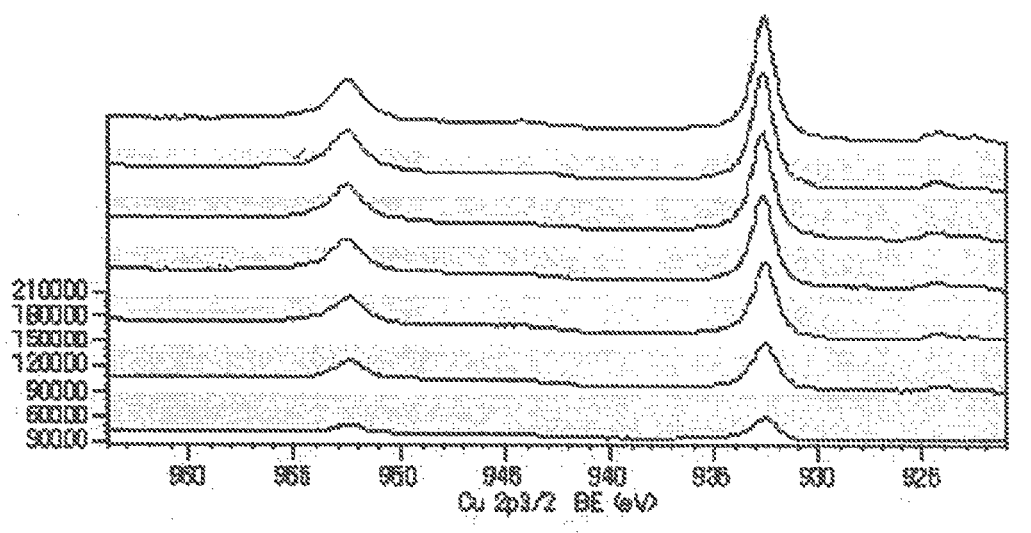
FIG. 30C Diagram showing the distribution of copper atoms in the XPS-Depth Profile compositional analysis data in Test Example 2.
Figure 31A:
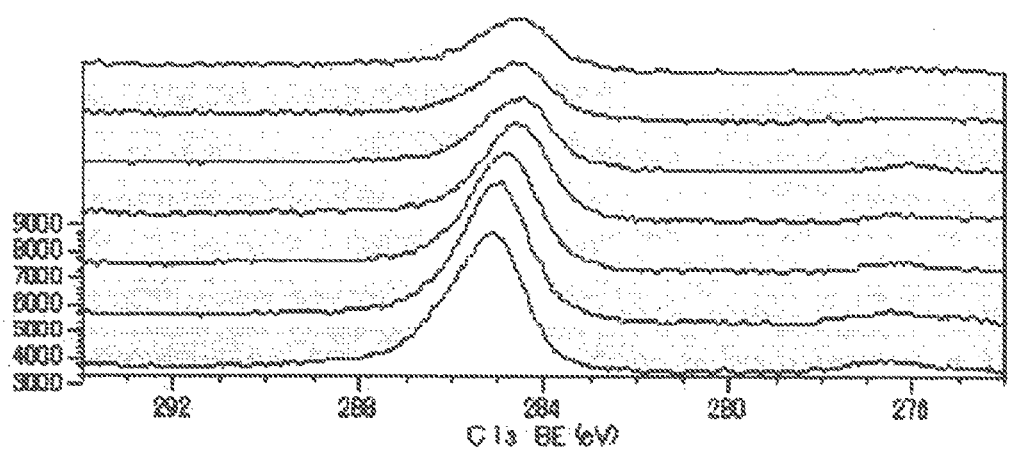
FIG. 31A Diagram showing the distribution of carbon atoms in the XPS-Depth Profile compositional analysis data in Test Example 3.
Figure 31B:
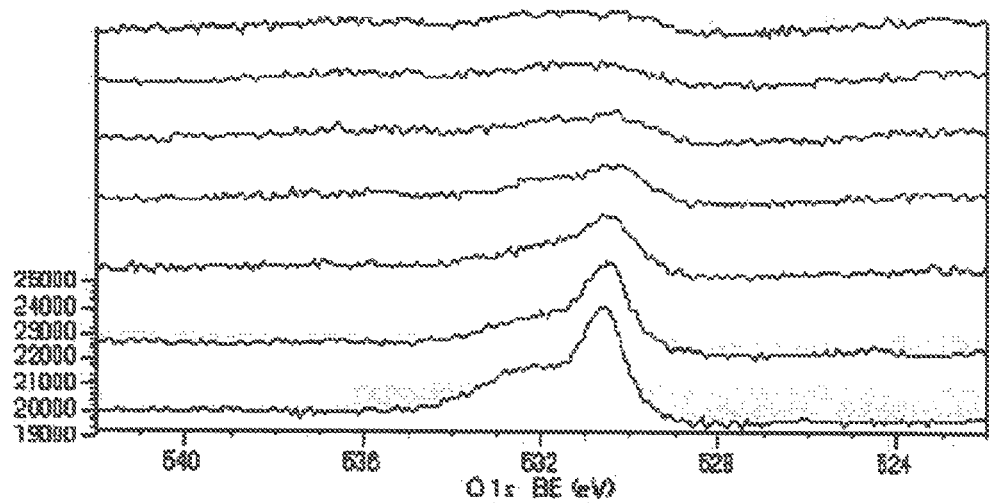
FIG. 31B Diagram showing the distribution of oxygen atoms in the XPS-Depth Profile compositional analysis data in Test Example 3.
Figure 31C:
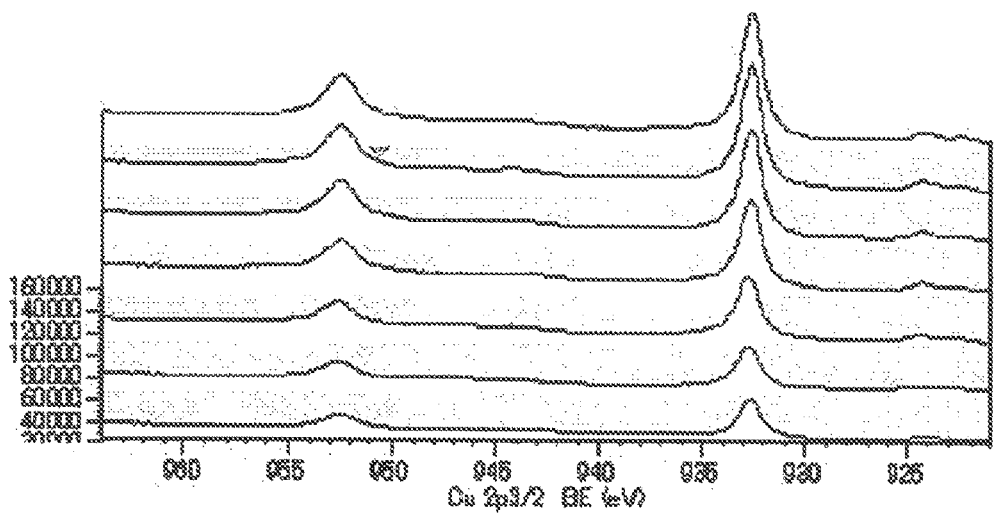
FIG. 31C Diagram showing the distribution of copper atoms in the XPS-Depth Profile compositional analysis data in Test Example 3.

The data in FIGS. 28 and 29 obtained by Narrow Scan show information of the compositions of the uppermost surfaces of the sintered copper films formed from copper paste compositions A and B. It is found that the uppermost surface of the sintered copper film formed from copper paste composition B has a high reduced copper ratio and has a small copper oxide component ratio and a small organic component ratio, as compared to that of copper paste composition A. The uppermost surface of the sintered copper film formed from copper paste composition A is coated with an aliphatic carboxylic acid which is presumed to be lauric acid, and the coating aliphatic carboxylic acid causes the organic component ratio to be increased. The film has an oxide component, but has reduced copper which is exposed in a considerable amount, and therefore the film is presumed not to be reduced in the contact resistance.

Next, the film was etched with argon ions and the surface composition in a region several nm from the uppermost surface of the film was clarified using a Depth Profile analysis by XPS.

From the results of the analysis, with respect to both copper paste compositions A and B, it is found that the region at a depth of more than 1 to 2 nm from the uppermost surface is comprised of reduced copper. With respect to copper paste composition B, even in a region at a depth of more than several nm, the carbon content is not reduced, as compared to that of copper paste composition A. From this, the sintering density for copper paste composition B is expected to be low.

Further, the results of the SEM examination clearly show a difference in the sintering density between the paste compositions, and this is considered to appear as a difference in the electric properties between the paste compositions. Accordingly, it is found that an important thing for the mechanism in which the coated copper particles exhibit a low-temperature sintering property is not that the coating material for the coated copper particles is removed at low temperatures but is that the coating material is removed to an appropriate extent such that contact of the copper particles with each other, necking, and interdiffusion of copper atoms are not inhibited.

In the sintered copper film obtained from the coated copper particle of the present invention, the aliphatic carboxylic acid as a coating material, which has been present between the particles, is efficiently removed and, meanwhile, contact of the particles with each other, necking, and interdiffusion of copper atoms are achieved, so that properties close to the resistance value of copper bulk can be achieved. Further, it also has been found that consequently, the uppermost surface of the sintered copper film is coated with the aliphatic carboxylic acid as a coating material, which can be expected to serve as a barrier layer for oxygen.

The method for producing coated copper particles of the present invention can produce coated copper particles having excellent oxidation resistance, which have a particle diameter controlled due to a unique micro-reaction field, and which have the surface thereof coated with a high-density coating layer of an aliphatic carboxylic acid. Further, it is considered that the obtained coated copper particles are comprised almost mainly of reduced copper and have the aliphatic carboxylic acid as a coating material bonded thereto through physical adsorption. For this reason, the coating material is eliminated at a temperature close to the boiling point of the coating material so that the coated copper particles exhibit a sintering ability. Therefore, a copper sintered film having a volume resistivity value close to that of copper bulk can be obtained from the coated copper particles, for example, under atmospheric pressure at a temperature as relatively low as 300° C. or lower. Further, a paste of the coated copper particles is prepared using, for example, a solvent, and a wiring pattern can be formed from the prepared paste by a method, such as screen printing, and the formed wiring pattern can be calcined in an atmosphere of a low oxygen concentration state, enabling construction of a production process having such high general-purpose properties that, for example, a general nitrogen-purged furnace can be used.

The whole of the disclosure of Japanese Patent Application No. 20104-112794 (application date: May 30, 2014) is included in the present specification by making a reference to it.

All the reference documents, patent applications, and technical standards described in the present specification are included in the present specification by making a reference to them to the same extent as that in the case where each of the reference documents, patent applications, and technical standards is specifically and individually shown to be included in the present specification by making a reference to each of them.

The invention claimed is:

1. A method for producing coated copper particles having a surface coated with an aliphatic carboxylic acid, the method comprising:
    obtaining a reaction mixture containing copper formate, an amino alcohol, an aliphatic carboxylic acid having an aliphatic group having 5 or more carbon atoms, and a solvent, and
    subjecting a complex compound formed in the reaction mixture to thermal decomposition treatment to form metal copper,
    wherein a ΔSP value, which is a difference in SP value between the amino alcohol and the solvent, is 4.2 or more.

2. The method for producing coated copper particles according to claim 1, wherein the amino alcohol has an SP value of 11.0 or more.

3. The method for producing coated copper particles according to claim 2, wherein the temperature for the thermal decomposition treatment is 100 to 130° C.

4. The method for producing coated copper particles according to claim 3, wherein the solvent comprises an organic solvent capable of forming an azeotrope together with water, wherein the thermal decomposition treatment comprises removing water formed due to the thermal decomposition treatment in the form of an azeotrope together with the organic solvent.

5. The method for producing coated copper particles according to claim 4, wherein the aliphatic group of the aliphatic carboxylic acid has 5 to 17 carbon atoms.

6. The method for producing coated copper particles according to claim 3, wherein the aliphatic group of the aliphatic carboxylic acid has 5 to 17 carbon atoms.

7. The method for producing coated copper particles according to claim 2, wherein the solvent comprises an organic solvent capable of forming an azeotrope together with water, wherein the thermal decomposition treatment comprises removing water formed due to the thermal decomposition treatment in the form of an azeotrope together with the organic solvent.

8. The method for producing coated copper particles according to claim 7, wherein the aliphatic group of the aliphatic carboxylic add has 5 to 17 carbon atoms.

9. The method for producing coated copper particles according to claim 2, wherein the aliphatic group of the aliphatic carboxylic acid has 5 to 17 carbon atoms.

10. The method for producing coated copper particles according to claim 2, wherein the reaction mixture has a copper ion concentration of 1.0 to 2.5 mol/liter.

11. The method for producing coated copper particles according to claim 1, wherein the temperature for the thermal decomposition treatment is 100 to 130° C.

12. The method for producing coated copper particles according to claim 11, wherein the solvent comprises an organic solvent capable of forming an azeotrope together with water, wherein the thermal decomposition treatment comprises removing water formed due to the thermal decomposition treatment in the form of an azeotrope together with the organic solvent.

13. The method for producing coated copper particles according to claim 12, wherein the aliphatic group of the aliphatic carboxylic acid has 5 to 17 carbon atoms.

14. The method for producing coated copper particles according to claim 11, wherein the aliphatic group of the aliphatic carboxylic acid has 5 to 17 carbon atoms.

15. The method for producing coated copper particles according to claim 11, wherein the reaction mixture has a copper ion concentration of 1.0 to 2.5 mol/liter.

16. The method for producing coated copper particles according to claim 1, wherein the solvent comprises an organic solvent capable of forming an azeotrope together with water, wherein the thermal decomposition treatment comprises removing water formed due to the thermal decomposition treatment in the form of an azeotrope together with the organic solvent.

17. The method for producing coated copper particles according to claim 16, wherein the aliphatic group of the aliphatic carboxylic acid has 5 to 17 carbon atoms.

18. The method for producing coated copper particles according to claim 16, wherein the reaction mixture has a copper ion concentration of 1.0 to 2.5 mol/liter.

19. The method for producing coated copper particles according to claim 1, wherein the aliphatic group of the aliphatic carboxylic acid has 5 to 17 carbon atoms.

20. The method for producing coated copper particles according to claim 1, wherein the reaction mixture has a copper ion concentration of 1.0 to 2.5 mol/liter.

* * * * *